(12) United States Patent
Crabtree et al.

(10) Patent No.: US 11,475,528 B2
(45) Date of Patent: *Oct. 18, 2022

(54) PLATFORM FOR LIVE ISSUANCE AND MANAGEMENT OF CYBER INSURANCE POLICIES

(71) Applicant: QOMPLX, Inc., Tysons, VA (US)

(72) Inventors: Jason Crabtree, Vienna, VA (US); Andrew Sellers, Monument, CO (US)

(73) Assignee: QOMPLX, INC., Tysons, VA (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/185,477

(22) Filed: Feb. 25, 2021

(65) Prior Publication Data

US 2021/0295447 A1   Sep. 23, 2021

Related U.S. Application Data

(63) Continuation of application No. 15/911,117, filed on Mar. 4, 2018, now Pat. No. 10,970,787, which is a
(Continued)

(51) Int. Cl.
*G06Q 40/00* (2012.01)
*G06Q 40/08* (2012.01)
(Continued)

(52) U.S. Cl.
CPC .......... *G06Q 40/08* (2013.01); *G06F 16/951* (2019.01); *G06N 5/045* (2013.01); *G06N 5/046* (2013.01);
(Continued)

(58) Field of Classification Search
CPC .............. G06Q 40/08; G06Q 30/0202; G06Q 30/0611; G06N 20/00; G06N 5/045;
(Continued)

(56) References Cited

U.S. PATENT DOCUMENTS 6,256,544 B1   7/2001   Weissinger
7,325,252 B2   1/2008   Bunker, V et al.
(Continued)

FOREIGN PATENT DOCUMENTS

JP   2004295666 A   10/2004
WO   2014159150 A1   10/2014
(Continued)

OTHER PUBLICATIONS

Galina A. Schwartz, et al., Cyber-insurance framework for large scale interdependent networks, HiCoNS '14: Proceedings of the 3rd international conference on High confidence networked systemsApr. 2014 pp. 145-154.
(Continued)

*Primary Examiner* — Jeffery L Williams

(74) *Attorney, Agent, or Firm* — Galvin Patent Law LLC; Brian R. Galvin

(57) ABSTRACT

A system for autonomous issuance and management of insurance policies for computer and information technology related risks, including but not limited to losses due to system availability, cloud computing failures, current and past data breaches, and data integrity issues. The system will use a variety of current risk information to assess the likelihood of operational interruption or loss due to both accidental issues and malicious activity. Based on these assessments, the system will be able to autonomously issue policies, adjust premium pricing, process claims, and seek re-insurance opportunities with a minimum of human input.

8 Claims, 19 Drawing Sheets

Related U.S. Application Data continuation-in-part of application No. 15/818,733, filed on Nov. 20, 2017, now Pat. No. 10,673,887, and a continuation-in-part of application No. 15/815,502, filed on Nov. 16, 2017, which is a continuation-in-part of application No. 15/725,274, filed on Oct. 4, 2017, now Pat. No. 10,609,079, which is a continuation-in-part of application No. 15/678,089, filed on Aug. 15, 2017, now Pat. No. 10,853,883, which is a continuation-in-part of application No. 15/655,113, filed on Jul. 20, 2017, now Pat. No. 10,735,456, which is a continuation-in-part of application No. 15/616,427, filed on Jun. 7, 2017, which is a continuation-in-part of application No. 15/343,209, filed on Nov. 4, 2016, now Pat. No. 11,087,403, which is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, which is a continuation-in-part of application No. 15/206,195, filed on Jul. 8, 2016, now abandoned, which is a continuation-in-part of application No. 15/186,453, filed on Jun. 18, 2016, which is a continuation-in-part of application No. 15/166,158, filed on May 26, 2016, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned.

(60) Provisional application No. 62/575,954, filed on Oct. 23, 2017.

(51) Int. Cl.
*G06Q 30/06* (2012.01)
*G06N 20/00* (2019.01)
*G06F 16/951* (2019.01)
*G06Q 30/02* (2012.01)
*G06N 5/04* (2006.01)
*G06N 7/00* (2006.01)
*G06N 3/00* (2006.01)
*G06N 3/02* (2006.01)

(52) U.S. Cl.
CPC .......... *G06N 20/00* (2019.01); *G06Q 30/0202* (2013.01); *G06Q 30/0611* (2013.01); *G06N 3/006* (2013.01); *G06N 3/02* (2013.01); *G06N 7/005* (2013.01)

(58) Field of Classification Search
CPC .......... G06N 5/046; G06N 3/006; G06N 3/02; G06N 7/005; G06F 16/951
See application file for complete search history.

(56) References Cited

U.S. PATENT DOCUMENTS

| | | | |
|---|---|---|---|
| 7,523,065 | B2 | 4/2009 | Eder |
| 7,711,584 | B2 | 5/2010 | Helitzer |
| 8,156,029 | B2 | 4/2012 | Szydlo |
| 8,285,698 | B2 | 10/2012 | Grabarnik et al. |
| 8,744,894 | B2 | 6/2014 | Christiansen et al. |
| 8,881,288 | B1 | 11/2014 | Levy et al. |
| 9,208,460 | B2 | 12/2015 | Rosen et al. |
| 9,602,530 | B2 | 3/2017 | Ellis et al. |
| 9,680,855 | B2 | 6/2017 | Schultz et al. |
| 10,038,703 | B2 | 7/2018 | Liu et al. |
| 10,061,635 | B2 | 8/2018 | Ellwein |
| 10,162,969 | B2 | 12/2018 | Knapp |
| 10,218,736 | B2 | 2/2019 | Ng et al. |
| 10,248,910 | B2 | 4/2019 | Crabtree et al. |
| 10,265,029 | B2 | 4/2019 | Sarrafzadeh et al. |
| 10,367,829 | B2 | 7/2019 | Huang et al. |
| 10,467,305 | B2 | 11/2019 | Onuma et al. |
| 10,523,682 | B1 | 12/2019 | Badawy et al. |
| 10,805,331 | B2 | 10/2020 | Boyer et al. |
| 2002/0002475 | A1 | 1/2002 | Freedman et al. |
| 2004/0260703 | A1 | 12/2004 | Elkins et al. |
| 2009/0089101 | A1 | 4/2009 | Hashim |
| 2009/0119133 | A1 | 5/2009 | Yeransian et al. |
| 2013/0218872 | A1 | 8/2013 | Jehuda |
| 2013/0297356 | A1* | 11/2013 | Rogers .................. G06Q 40/00 705/4 |
| 2016/0110819 | A1 | 4/2016 | Abramowitz |
| 2016/0171415 | A1 | 6/2016 | Yampolskiy et al. |
| 2016/0275123 | A1 | 9/2016 | Lin et al. |
| 2017/0061547 | A1 | 3/2017 | Borden et al. |
| 2018/0121658 | A1 | 5/2018 | Ross et al. |
| 2021/0035224 | A1* | 2/2021 | Crabtree ............ G06Q 30/0611 |
| 2021/0073915 | A1* | 3/2021 | Crabtree ............ G06Q 10/0635 |
| 2021/0342836 | A1* | 11/2021 | Celia .................. G06Q 20/401 |

FOREIGN PATENT DOCUMENTS

| | | |
|---|---|---|
| WO | 2016109608 A1 | 7/2016 |
| WO | 2017075543 A1 | 5/2017 |

OTHER PUBLICATIONS

Sivadon Chaisiri, et al., A Joint Optimization Approach to Security-as-a-Service Allocation and Cyber Insurance Management, 2015 IEEE Trustcom/BigDataSE/ISPA, pp. 1-8.

\* cited by examiner

Propensity To Be Attacked Matrix

| | Customer Information (PII/PHI) | Financial Assets | Operational Assets | Health Data | Employee Assets | Intellectual Property | Customer/ Partner Connectivity | Attacker % |
|---|---|---|---|---|---|---|---|---|
| Cyber Criminal | T | T | T | T | N | N | T | 50% |
| Disgruntled Employee | N | T | T | N | N | N | T | 10% |
| Social Engineers | T | T | N | N | N | N | N | 30% |
| Script Kiddies | N | N | N | N | N | N | N | 10% |
| PRISMA rating equivalent | 3 | 3 | 3 | 2 | 1 | 1 | 1 | |

PTBA matrix for a regional hospital chain (T = threat; N = not a significant threat)

Fig. 14

Threat Profile Matrix 1500

| Threat Level | Commitment | | | Resources | | |
|---|---|---|---|---|---|---|
| | Intensity | Stealth | Time | Technical Personnel | Technical Knowledge | Access |
| 1 | H | H | Years to decades | Hundreds | H | H |
| 2 | H | H | Years to decades | Tens of tens | M | M |
| 3 | H | H | Months to years | Tens of tens | H | M |
| 4 | M | H | Weeks to months | Tens | H | M |
| 5 | H | M | Weeks to months | Tens | M | M |
| 6 | M | M | Weeks to months | Ones | M | L |
| 7 | M | M | Months to years | Tens | L | L |
| 8 | L | L | Days to weeks | Ones | L | L |

PLATFORM FOR LIVE ISSUANCE AND MANAGEMENT OF CYBER INSURANCE POLICIES

CROSS-REFERENCE TO RELATED APPLICATIONS

| Application No. | Date Filed | Title |
|---|---|---|
| Current application | Herewith | PLATFORM FOR LIVE ISSUANCE AND MANAGEMENT OF CYBER INSURANCE POLICIES |
| | | Is a continuation of: |
| 15/911,117 | Mar. 4, 2018 | PLATFORM FOR LIVE ISSUANCE AND MANAGEMENT OF CYBER INSURANCE POLICIES |
| | | which is a continuation-in-part of: |
| 15/818,733 U.S. Pat. No.: 10,673,887 | Nov. 20, 2017 Issue Date: Jun. 2, 2020 | SYSTEM AND METHOD FOR CYBERSECURITY ANALYSIS AND SCORE GENERATION FOR INSURANCE PURPOSES |
| | | which is a continuation-in-part of: |
| 15/725,274 U.S. Pat. No.: 10,609,079 | Oct. 4, 2017 Issue Date: Mar. 31, 2020 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT |
| | | which is a continuation-in-part of: |
| 15/655,113 U.S. Pat. No.: 10,735,456 | Jul. 20, 2017 Issue Date: Aug. 4, 2020 | ADVANCED CYBERSECURITY THREAT MITIGATION USING BEHAVIORAL AND DEEP ANALYTICS |
| | | which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | which is a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| | | which is a continuation-in-part of: |
| 15/237,625 U.S. Pat. No.: 10,248,910 | Aug. 15, 2016 Issue Date: Apr. 2, 2019 | DETECTION MITIGATION AND REMEDIATION OF CYBERATTACKS EMPLOYING AN ADVANCED CYBER-DECISION PLATFORM |
| | | which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |
| | | which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION |
| | | which is a continuation-in-part of: |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY |
| | | which is a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION |
| | | which is a continuation-in-part of: |
| 15/091,563 U.S. Pat. No.: 10,204,147 | Apr. 5, 2016 Issue Date: Feb. 12, 2019 | SYSTEM FOR CAPTURE, ANALYSIS AND STORAGE OF TIME SERIES DATA FROM SENSORS WITH HETEROGENEOUS REPORT INTERVAL PROFILES |
| | | and is also a continuation-in-part of: |
| 14/986,536 U.S. Pat. No.: 10,210,255 | Dec. 31, 2015 Issue Date: Feb. 19, 2019 | DISTRIBUTED SYSTEM FOR LARGE VOLUME DEEP WEB DATA EXTRACTION |
| | | and is also a continuation-in-part of: |

-continued

| Application No. | Date Filed | Title |
|---|---|---|
| 14/925,974 | Oct. 28, 2015 | RAPID PREDICTIVE ANALYSIS OF VERY LARGE DATA SETS USING THE DISTRIBUTED COMPUTATIONAL GRAPH |
| | | which is a continuation-in-part of: |
| 15/815,502 | Nov. 16, 2017 | PLATFORM FOR AUTONOMOUS MANAGEMENT OF RISK TRANSFER |
| | | which claims benefit of, and priority to: |
| 62/575,954 | Oct. 23, 2017 | AUTOMATED INSURANCE COMPANY ADMINISTRATION |
| | | which is a continuation-in-part of: |
| 15/376,657 U.S. Pat. No.: 10,402,906 | Dec. 13, 2016 Issue Date: Sep. 3, 2019 | QUANTIFICATION FOR INVESTMENT VEHICLE MANAGEMENT EMPLOYING AN ADVANCED DECISION PLATFORM |
| | | which is a continuation-in-part of: |
| 15/237,625 U.S. Pat. No.: 10,248,910 | Aug. 15, 2016 Issue Date: Apr. 2, 2019 | DETECTION MITIGATION AND REMEDIATION OF CYBERATTACKS EMPLOYING AN ADVANCED CYBER-DECISION PLATFORM |
| | | which is a continuation-in-part of: |
| 15/343,209 | Nov. 4, 2016 | RISK QUANTIFICATION FOR INSURANCE PROCESS MANAGEMENT EMPLOYING AN ADVANCED DECISION PLATFORM |
| | | which is a continuation-in-part of: |
| 15/237,625 U.S. Pat. No.: 10,248,910 | Aug. 15, 2016 Issue Date: Apr. 2, 2019 | DETECTION MITIGATION AND REMEDIATION OF CYBERATTACKS EMPLOYING AN ADVANCED CYBER-DECISION PLATFORM |
| | | which is a continuation-in-part of: |
| 15/229,476 U.S. Pat. No.: 10,454,791 | Aug. 5, 2016 Issue Date: Oct. 22, 2019 | HIGHLY SCALABLE DISTRIBUTED CONNECTION INTERFACE FOR DATA CAPTURE FROM MULTIPLE NETWORK SERVICE SOURCES |
| | | which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |
| | | which is a continuation-in-part of: |
| 15/678,089 | Aug. 15, 2017 | CYBERSECURITY PROFILE GENERATED USING A SIMULATION ENGINE |
| | | which is a continuation-in-part of: |
| 15/343,209 | Nov. 4, 2016 | RISK QUANTIFICATION FOR INSURANCE PROCESS MANAGEMENT EMPLOYING AN ADVANCED DECISION PLATFORM | the entire specification of each of which is incorporated herein by reference.

BACKGROUND OF THE INVENTION

Field of the Invention

The disclosure relates to the field of automated computer systems, particularly to autonomous issuance and management of insurance policies for computer and information technology related risks.

Discussion of the State of the Art

In a typical insurance business, vast amounts of data may be required to be analyzed to determine underwriting offers that would be suitable for both an insured and an insurer. This may include associated risks, premium pricing, pending offers, verifying damages, and the like. It may also be time-consuming to consider all the factors needed to determine the best possible outcome both parties Another issue in typical insurance may be the wait to process a claim. The industry is already moving towards greater automation, and the move has already shown marked improvements in both convenience for the insured as well as quicker turnaround. While many aspects may presently be automated, there are other aspects that may benefit greater with automation.

Particularly in the field of cyber insurance (policies related to computer and information technology related risks, such as interruption of cloud server access or malicious hacking) there is a substantial gap between the rate at which the risks evolve and the rate at which policies can be updated to address the evolving risks. Unlike insurance policies for traditional risks such as fire, flood, automobile, etc., where the risks are largely fixed in nature, the risks associated with cyber-related insurance policies are constantly evolving as both the technology used by businesses changes (for example the move to cloud-based computing) and the methods of cyber-attack evolve (because they are driven by malicious human actors, and not natural events). Cyber-related risks can change on a weekly, daily, and even hourly basis, whereas traditional underwriting methods evolve on the order of years to decades. Thus, insurance policies for cyber-related risks can lag substantially behind the risks they purport to cover, creating potential coverage gaps for the insured and additional risk for the insurer.

What is needed is a system that automates the process of underwriting insurance policies for cyber-related risks. This system should be able to automatically gather and assess near real-time information regarding the risks associated with insurance policies for cyber-related risks, and issue policies, adjust premium pricing, process claims, and seek re-insurance opportunities with a minimum of human input. Ideally, to protect both the insurer and insured, such a system would additionally make efforts to mitigate the impact of evolving cyber security risks, such as notification of current threats and recommendation of mitigation measures.

SUMMARY OF THE INVENTION

Accordingly, the inventor has conceived, and reduced to practice, a system and method for autonomous issuance and management of insurance policies for business interruption and loss associated with computer and information technology related risks, including but not limited to: system availability, cloud computing failures, current and past data breaches, data integrity issues, denial of service attacks, and other accidental events and malicious activity. This system will start with traditional underwriting information such as questionnaires and will add insurance-specific instrumentation and internet-enabled scanning to automatically analyze cyber insurance risks. The system will assess the likelihood of business interruption or loss due to both accidental issues such as data loss, loss of access to cloud computing platforms, etc., and malicious activity such as hacking, various forms of cyber attacks, and data theft. As part of its analysis, the system will create matrices designed to assess threat profiles, propensity to be attacked, and potential for loss, including in its analysis factors such as cloud-based application and usage, perimeter security, stack security vendors and configurations, internal network topologies and segmentation, anti-virus and endpoint prevention capabilities, identity and privilege management, endpoint software, and types and value of data stored, along with information about active and potential modes of attack, redundancy of systems, and similar factors. Based on these assessments, the system will be able to autonomously issue policies, adjust premium pricing, process claims, and seek re-insurance opportunities with a minimum of human input.

According to a preferred embodiment, a client portal may be provided through a network-connected server, which allows the client to manage its insurance policies, including but not limited to applying for insurance coverage, making premium payments, submitting claims, and receiving claim payouts. Information from the portal is sent to the underwriting processor, which performs automated management of the underwriting process. For insurance policies involving computer and information technology related risks, the underwriting processor sends relevant information to the cyber risk analysis engine. Based on queries by the cyber risk analysis engine, a deep web extraction engine gathers a variety of near real-time information from a plurality of online sources related to the status of networks, availability of cloud computing platforms, active and potential cyber attacks, and other information relevant to the query. The deep web extraction engine feeds the gathered information back to the cyber risk analysis engine, which performs assessments using machine learning algorithms to assess risks due to both accidental causes and malicious activity. The results from the risk analysis are fed back to the underwriting processor, which uses those results to perform automated underwriting management.

In another preferred embodiment, a method autonomously issuing and managing insurance policies for computer and information technology related risks would be used, comprising the steps of: (a) providing a network-connected portal for clients to manage their insurance policies; (b) gathering a variety of data from about a plurality of potential risks related to use to computer and information technology; (c) analyzing the likelihood of business interruption or loss from a plurality of computer and information technology related risks; (d) creating a contract block by compiling the request into a computational graph-based format, with an automated underwriting processor; (e) linking the contract block to the requester, with the automated underwriting processor; (f) storing the contract block into memory, with the automated underwriting processor; (g) retrieving a plurality of available underwriting agreements from memory, with the automated underwriting processor; (h) creating an offer list by perform computational graph operations on the contract block to determine at least a risk-transfer agreement based at least on calculated risk associated with the request, contextual consideration of an existing contract portfolio, and the plurality of available underwriting agreements, with the automated underwriting processor; and (i) presenting the offer list to the requester, with the network-connected server.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

FIG. 14 is a diagram illustrating an aspect of an embodiment, a propensity to be attacked (PTBA) matrix.

FIG. 15 is a diagram illustrating an aspect of an embodiment, a threat profile matrix.

DETAILED DESCRIPTION

Figure 1:
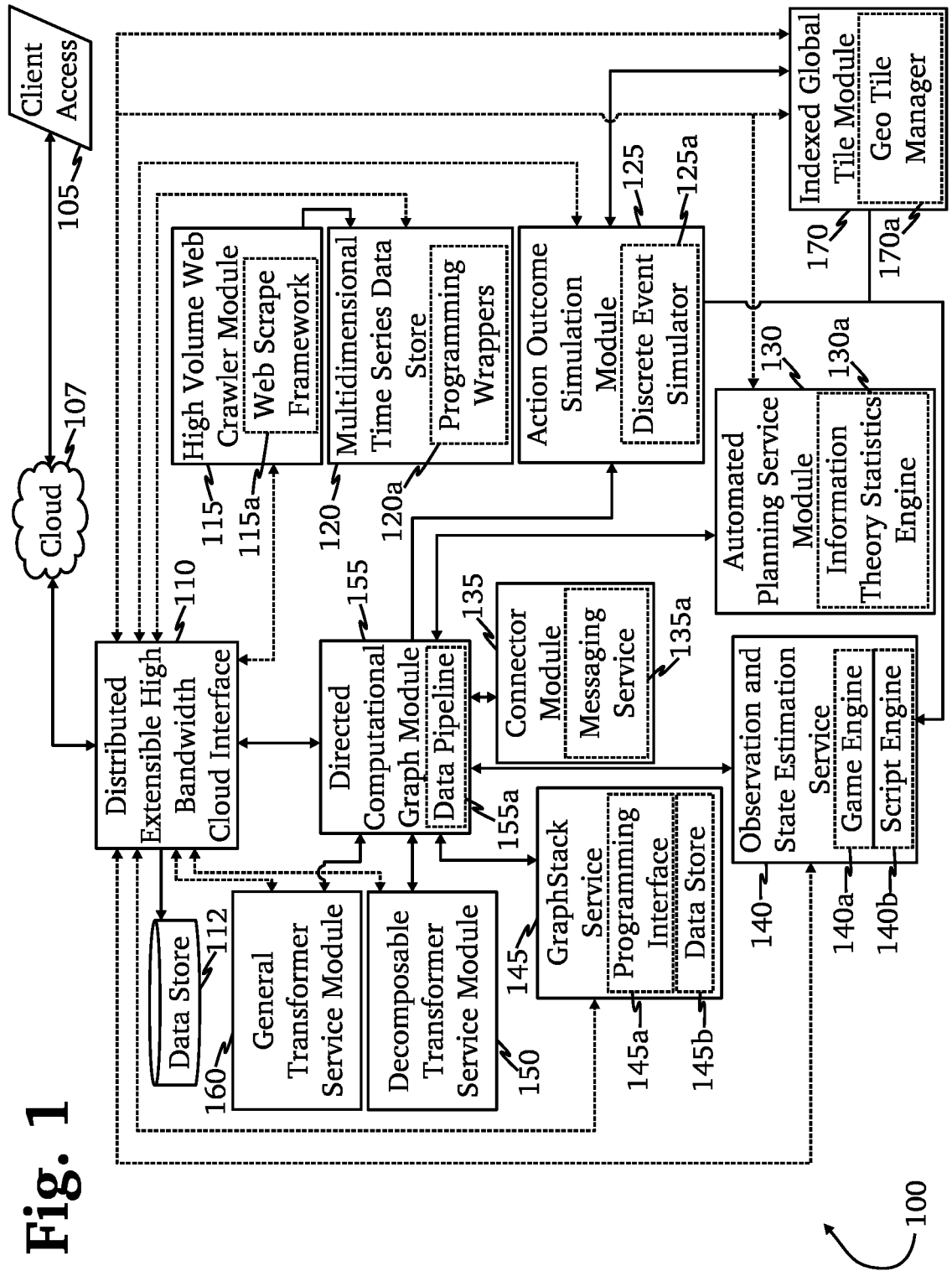
FIG. 1 is a diagram of an exemplary architecture of a enterprise operating system according to an embodiment of the invention.

The inventor has conceived, and reduced to practice, a system and method for autonomous issuance and management of insurance policies for business interruption and loss associated with computer and information technology related risks, including but not limited to: system availability, cloud computing failures, current and past data breaches, data integrity issues, denial of service attacks, and other accidental events and malicious activity.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

As used herein, "graph" is a representation of information and relationships, where each primary unit of information makes up a "node" or "vertex" of the graph and the relationship between two nodes makes up an edge of the graph. The concept of "node" as used herein can be quite general; nodes are elements of a workflow that produce data output (or other side effects to include internal data changes), and nodes may be for example (but not limited to) data stores that are queried or transformations that return the result of arbitrary operations over input data. Nodes can be further qualified by the connection of one or more descriptors or "properties" to that node. For example, given the node "James R," name information for a person, qualifying properties might be "183 cm tall", "DOB 08/13/1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph=(Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention.

As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

A "data context", as used herein, refers to a set of arguments identifying the location of data. This could be a Rabbit queue, a .csv file in cloud-based storage, or any other such location reference except a single event or record. Activities may pass either events or data contexts to each other for processing. The nature of a pipeline allows for direct information passing between activities, and data locations or files do not need to be predetermined at pipeline start.

A "pipeline", as used herein and interchangeably referred to as a "data pipeline" or a "processing pipeline", refers to a set of data streaming activities and batch activities. Streaming and batch activities can be connected indiscriminately within a pipeline. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, or optionally an external trigger. The events are held in a queue or similar until processing. Each batch activity may contain a "source" data context (this may be a streaming context if the upstream activities are streaming), and a "destination" data context (which is passed to the next activity). Streaming activities may have an optional "destination" streaming data context (optional meaning: caching/persistence of events vs. ephemeral), though this should not be part of the initial implementation.

Conceptual Architecture

FIG. 1 is a diagram of an exemplary architecture of a enterprise operating system 100 according to an embodiment of the invention. Client access to system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the enterprise data analyzed by the system both from sources within the confines of the client enterprise, and from cloud based sources 107, public or proprietary such as, but not limited to: subscribed enterprise field-specific data services, external remote sensors, subscribed satellite image and data feeds and web sites of interest to enterprise operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and a graph stack service 145. Directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within directed computational graph module 155, data may be split into two identical streams in a specialized pre-programmed data pipeline 155a, wherein one sub-stream may be sent for batch processing and storage while the other sub-stream may be reformatted for transformation pipeline analysis. The data may be then transferred to a general transformer service module 160 for linear data transformation as part of analysis or the decomposable transformer service module 150 for branching or iterative transformations that are part of analysis. Directed computational graph module 155 represents all data as directed graphs where the transformations are nodes and the result messages between transformations edges of the graph. High-volume web crawling module 115 may use multiple server hosted preprogrammed web spiders which, while autonomously configured, may be deployed within a web scraping framework 115a of which SCRAPY™ is an example, to identify and retrieve data of interest from web based sources that are not well tagged by conventional web crawling technology. Multiple dimension time series data store module 120 may receive streaming data from a large plurality of sensors that may be of several different types. Multiple dimension time series data store module 120 may also store any time series data encountered by system 100 such as, but not limited to, environmental factors at insured client infrastructure sites, component sensor readings and system logs of some or all insured client equipment, weather and catastrophic event reports for regions an insured client occupies, political communiques and/or news from regions hosting insured client infrastructure and network service information captures (such as, but not limited to, news, capital funding opportunities and financial feeds, and sales, market condition), and service related customer data. Multiple dimension time series data store module 120 may accommodate irregular and high-volume surges by dynamically allotting network bandwidth and server processing channels to process the incoming data. Inclusion of programming wrappers 120a for languages—examples of which may include, but are not limited to, C++, PERL, PYTHON, and ERLANG™—allows sophisticated programming logic to be added to default functions of multidimensional time series database 120 without intimate knowledge of the core programming, greatly extending breadth of function. Data retrieved by multidimensional time series database 120 and high-volume web crawling module 115 may be further analyzed and transformed into task-optimized results by directed computational graph 155 and associated general transformer service 160 and decomposable transformer service 150 modules. Alternately, data from the multidimensional time series database and high-volume web crawling modules may be sent, often with scripted cuing information determining important vertices 145a, to graph stack service module 145 which, employing standardized protocols for converting streams of information into graph representations of that data, for example open graph internet technology (although the invention is not reliant on any one standard). Through the steps, graph stack service module 145 represents data in graphical form influenced by any pre-determined scripted modifications 145a and stores it in a graph-based data store 145b such as GIRAPH™ or a key-value pair type data store REDIS™, or RIAK™, among others, any of which are suitable for storing graph-based information.

Results of the transformative analysis process may then be combined with further client directives, additional operational rules and practices relevant to the analysis and situational information external to the data already available in automated planning service module 130, which also runs powerful information theory-based predictive statistics functions and machine learning algorithms 130a to allow future trends and outcomes to be rapidly forecast based upon the current system derived results and choosing each a plurality of possible operational decisions. Then, using all or most available data, automated planning service module 130 may propose operational decisions most likely to result in favorable operational outcomes with a usably high level of certainty. Closely related to the automated planning service module 130 in the use of system-derived results in conjunction with possible externally supplied additional information in the assistance of end user operational decision making, action outcome simulation module 125 with a discrete event simulator programming module 125a coupled with an end user-facing observation and state estimation service 140, which is highly scriptable 140b as circumstances require and has a game engine 140a to more realistically stage possible outcomes of operational decisions under consideration, allows enterprise decision makers to investigate the probable outcomes of choosing one pending course of action over another based upon analysis of the current available data.

A significant proportion of the data that is retrieved and transformed by the enterprise operating system, both in real world analyses and as predictive simulations that build upon intelligent extrapolations of real world data, may include a geospatial component. The indexed global tile module 170 and its associated geo tile manager 170a may manage externally available, standardized geospatial tiles and may enable other components of the enterprise operating system, through programming methods, to access and manipulate meta-information associated with geospatial tiles and stored by the system. The enterprise operating system may manipulate this component over the time frame of an analysis and potentially beyond such that, in addition to other discriminators, the data is also tagged, or indexed, with their coordinates of origin on the globe. This may allow the system to better integrate and store analysis specific information with all available information within the same geographical region. Such ability makes possible not only another layer of transformative capability, but may greatly augment presentation of data by anchoring to geographic images including satellite imagery and superimposed maps both during presentation of real world data and simulation runs.

Figure 2:
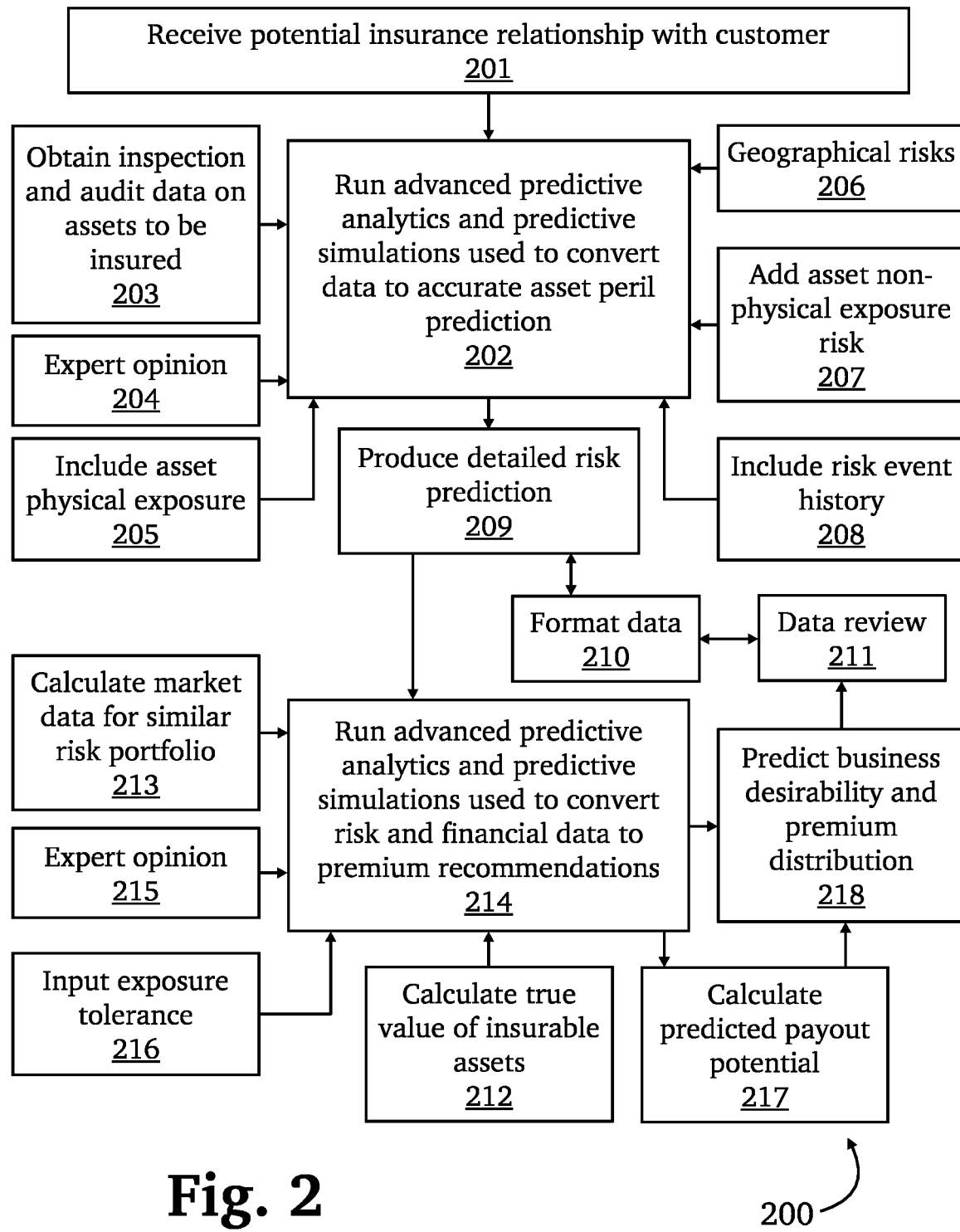
FIG. 2 is a flow diagram of an exemplary function of the enterprise operating system in the calculation of asset hazard and risk in relationship to premium fixation informed by the existing risk accumulated in existing contracts (without loss of generality, across many perils) in a given portfolio.

FIG. 2 is a flow diagram of an exemplary function 200 of the enterprise operating system in the calculation of asset hazard and risk in relationship to premium fixation. In an embodiment, the prospect of a new insurance customer is presented at step 201. Several pieces of data combine to produce an insurance relationship that optimally serves both customer and insurer. All of this data must be cleanly analyzed not only individually but also as a whole, combined in multiple permutations and with the ability to uncover hard to foresee relationships and future possible pitfalls. The enterprise operating system 100 previously disclosed in co-pending application Ser. No. 15/141,752 and applied in a role of cybersecurity in co-pending application Ser. No. 15/237,625, when programmed to operate as an insurance decision platform, is very well suited to perform advanced predictive analytics and predictive simulations to produce risk predictions needed required by actuaries and underwriters to generate accurate tables for later pricing at step 202. Data forming the basis of these calculations may be drawn from a set comprising at least: inspection and audit data on the condition and worth of the customer's equipment and infrastructure to be insured at step 203; known and probable physical risks to customer's assets such as but not limited to: flooding, volcanic eruption, wildfires, tornado activity, hurricane or typhoon, earthquake among other similar dangers known to those skilled in the art at step 205; non-physical risks to customer's assets which may include, but are not limited to: electronic or cyberattack, and defective operating software as well as other similar risks known to those skilled in the field at step 207; and geographical risks, which may include but are not limited to: political and economic unrest, crime rates, government actions, and escalation of regional tensions at step 206. Also of great importance may be the actual history of risk events at step 208 occurring at or near the sites of a customer's assets as such data provides at least some insight into the occurrence and regularity of possible payout requiring events to be analyzed prior to policy generation. For the most complete and thereby accurate use of predictive analytics and predictive simulation, the possibility to add expert opinion and experience at step 204 to the body of data should be available. Important insights into aspects of a potential client may not be present or gleaned by the analysis of the other available data. An observation made by an insurer's expert during the process, even if seemingly minor, may, when analyzed with other available data, give rise to additional queries that must be pursued or significantly change the predictive risk recommendations produced at step 209 by the insurance decision platform during step 202.

The generation of detailed risk prediction data during step 209, which may have granularity to every unit of equipment possessed and each structure as well as support land and services of each area of infrastructure as would be known to those skilled in the field, is of great value on its own and its display at step 211, possibly in several presentation formats prepared at step 210 for different insurer groups may be needed, for example as a strong basis for the work of actuaries and underwriters to derive risk cost tables and guides, among multiple other groups who may be known to those skilled in the field. Once expert risk-cost data is determined, it may be input at step 211, system formatted and cleaned at step 210 and added to the system generated risk prediction data, along with contributions by other insurer employed groups to the data to be used in predictive calculation of desirability of insuring the new venture and premium recommendations in steps 214 and 218. Some factors that may be retrieved and employed by the system here are: to gather available market data for similar risk portfolios as pricing and insurer financial impact guidelines at step 213; all available data for all equipment and infrastructure to be insured may also be reanalyzed for accuracy, especially for replacement values which may fluctuate greatly and need to be adjusted intelligently to reflect that at step 212; the probabilities of multiple disaster payouts or cascading payouts between linked sites as well as other rare events or very rare events must be either predicted or explored and accounted for at step 217; an honest assessment of insurer company risk exposure tolerance as it is related to the possible customer's specific variables must be considered for intelligent predictive recommendations to be made at step 216; also potential payout capital sources for the new venture must be investigated be they traditional in nature or alternative such as, but not limited to insurance linked security funds at step 219; again, the possibility of expert opinion data 215 should be available to the system during analysis and prediction of desirability recommendations and premiums changed at step 218. All recommendations may be formatted at step 210 for specific groups within the insurer company and possibly portions for the perspective client and displayed for review at step 211.

While all descriptions above present use of the insurance decision platform for new clients, the majority of the above process is also applicable to such tasks as policy renewals or expansions.

Figure 3:
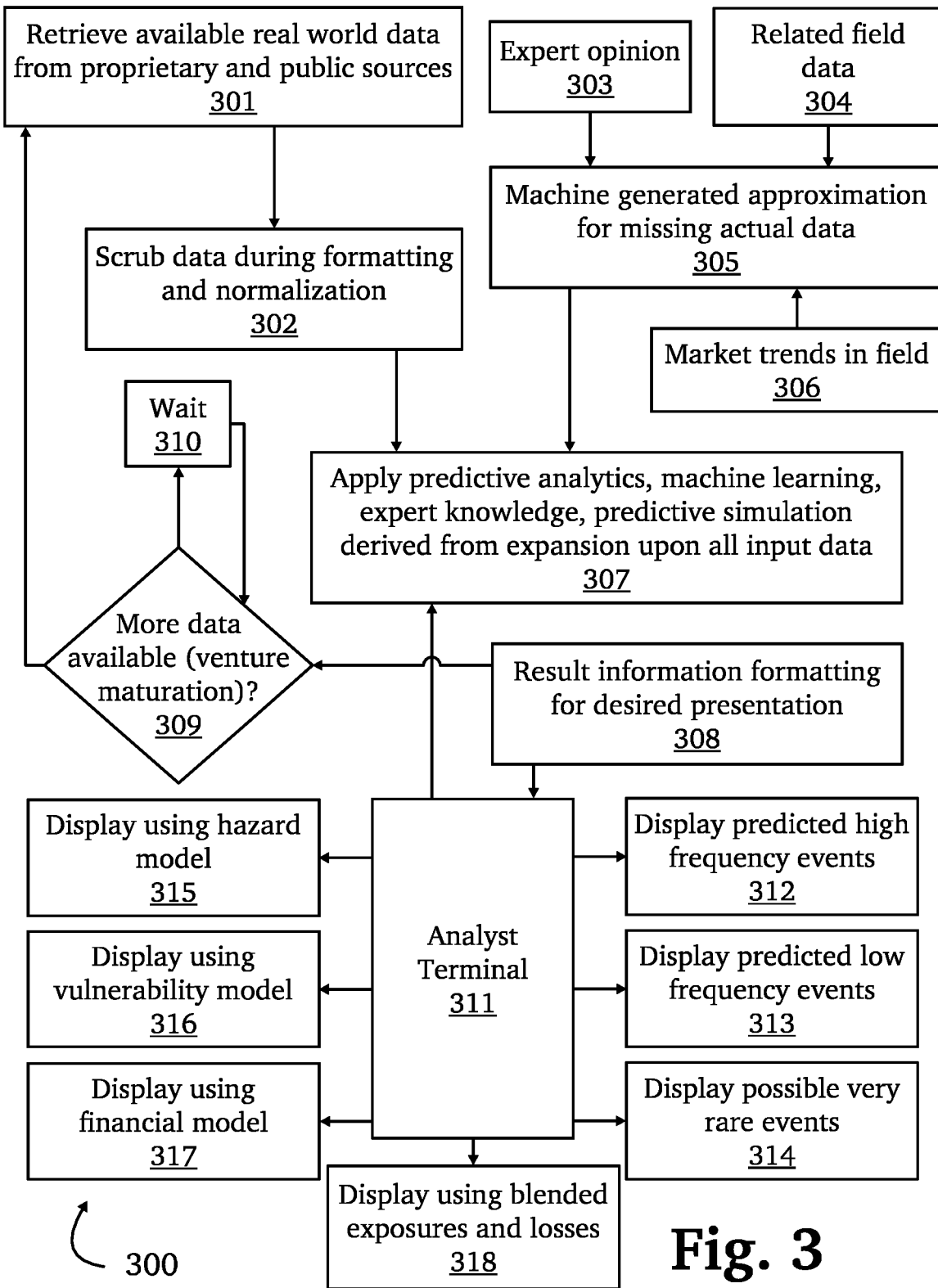
FIG. 3 is a process diagram showing enterprise operating system functions in use to present comprehensive data and estimate driven predictive recommendations in emerging insurance markets using several possible presentation model formats.

FIG. 3 is a process diagram showing enterprise operating system functions 300 in use to present comprehensive data and estimate driven predictive recommendations in emerging insurance markets using several possible presentation model formats. New insurance markets are continuously arising and the ability to profitably participate is of great importance. An embodiment of the invention programmed to analyze insurance related data and recommend insurance decisions may greatly assist in development of a profitable pathway in new insurance opportunities. Retrieval or input of any prospective new field related data from a plurality of both public and available private or proprietary sources acts to seed the process at step 301, specific modules of the system such as the connector module 135 with its programmable messaging service 135a, the High volume web crawler 115 and the directed computational graph module 155, among possible others act to scrub format and normalize data at step 302 from many sources for use. In new fields of possible insurance venture, many pieces of data necessary and useful for the arrival at reliable and informed decision are absent. Some of this can be circumvented by the presence of expert opinion from insurer's employees and outside consultants who may work in the field targeted by the venture at step 303 much of the rest of the information must be predictively synthesized using such sources as data available from insurance ventures in related fields at step 304, and market trends in the field at step 306 among other factors known to those skilled in the field and reliable approximations by the system based upon these factors at step 305. Actual data and estimates when combined may be further combined and predictively transformed by the insurance decision platform at step 307 to produce the most reliable model and recommendations possible to be considered by decision makers at the insurer such as actuaries, underwriters, financial officers and brokers to decide on the best path forward at step 308 without each of them having to have found and processed the data themselves which may have led to omissions and errors. Also, if the venture is pursued, the system may continuously monitor all resulting data such that the model may be continuously improved by re-running steps 309, 310, and 301; and both insurer profitability and insurance coverage for the client are best optimized. Results may be formatted for display and manipulation via the analyst terminal 311 in several different ways a few of which include a hazard model at step 315 which defines arbitrary characteristics of potential disasters or loss-initiating events and their frequency, location and severity using analytics or modeling simulation. In this display model, single-event characteristics are enhanced with event-set generation tools. A vulnerability model at step 316 which specify the response of insured assets and areas of interest based on the magnitude of experienced events. This display model blends expert opinion with empirical data and extracted models and can be re-configured to accommodate custom weightings. A financial model at step 317 which takes into account financial impact across all monitored assets and scenarios with each platform convolution while also considering portfolio-level losses and distributions. This model provides data optimized for making informed operational decisions using an expected probability curve and promotes consideration of tools such as the tail value-at-risk to understand exposures to large single-event losses. Finally, a blended exposures and losses model at step 318 which operates under the knowledge that risks that may result in numerous losses concentrated in space and time are especially challenging. The strong correlation between inland flooding, storm surge and wind damage from hurricanes is a canonical example. This model optimizes the result data for display of multi-peril analysis to improve product development and introduction while balancing concerns related to correlated risk accumulation via modeling and named-peril risk transfer even on all peril or multi-peril primary insurance products.

In addition to displaying the specifics of a new venture under the differential illumination of the above display models, asset peril may be visualized by predicted occurrence probabilities which range from "high frequency events" at step 312 which are usually of low and estimable severity per single event, low in peril risk, which is most easily calculated, has an estimable frequency when analytics are used and may follow a Gaussian type 1 distribution; to "low frequency events" at step 313 which may be of high severity per single event engenders a catastrophic event risk which is calculable and may be at least partially mitigatable, is difficult to estimate in frequency and thus may require both predictive analytic and simulation transformation to determine and follows a type 2 fat-tailed power law distribution; and last events that must be classified as "very rare" at step 314 which may be extremely severe if they occur possibly forecast by simulation, have an "existential" risk factor which is calculable only in terms of the impact of the event and may only be roughly estimable by input expert judgement, frequency cannot be forecast. Of course display of venture specific events of predicted as "high frequency" and "low frequency" are most likely whereas display of machine simulated "very rare" events are of value to spark further exploration and discussion.

In another embodiment, the processed data may be used as input to a fully autonomous system. One such system in discussed below in FIG. 8.

Figure 4:
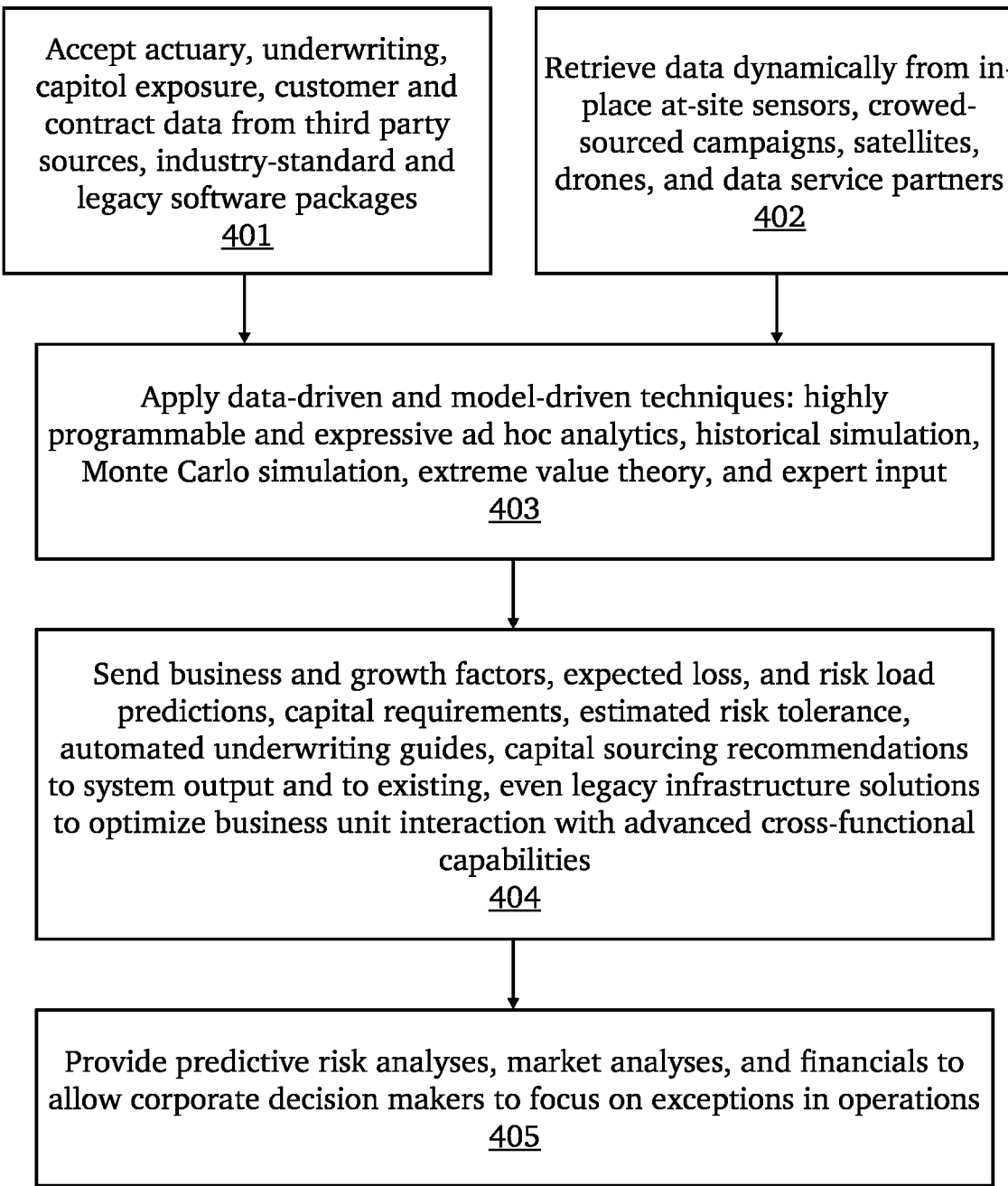
FIG. 4 is a process flow diagram of a possible role in a more generalized insurance workflow as per one embodiment of the invention.

FIG. 4 is a process flow diagram of a possible role in a more generalized insurance workflow 400 as per one embodiment of the invention. It is important that any added computational capability, such as the SaaS insurance decision platform, integrate with the majority, if not all of an insurer's existing workflow while opening the enterprise to new sources of information and predictive capabilities. With its programmable connector module 135 and messaging center 135a, the insurance decision platform 100 is pre-designed to retrieve and transform data from the APIs of virtually all industry standard software packages and can be programmed to retrieve information from other legacy or obscure sources as needed, as an example, data may even be entered as csv and transformed, as a simplistic choice from the many possible formats known to one skilled in the art and for which the platform is capable to handle at step 401. Of greatly added value, the platform may allow the client insurer to receive data dynamically from in-place at site sensors at insurance client sites or in various areas of interest at step 402 due to the multidimensional time series 120 data store which can be programmed to interpret and correctly normalize many data streams 120a. Feeds from crowd sourced campaigns, satellites, drones, sources which may not have been available to the insurer client in the past can also be used as information sources as can a plurality of insurance related data, both on the general web and from data service providers may also add to the full complement of data the insurer client can use for decision making. To reliably and usefully process all of this data which can quickly overwhelm even a team dedicated to accumulation and cleansing, the platform may transform and analyze the data with model and data driven algorithms which include but are not limited to ad hoc analytics, historical simulation, Monte Carlo exploration of the state space, extreme value theory and processes augmented by insurance expert input at step 403 as well as other techniques known to be useful in these circumstances by those knowledgeable in the art, for which the platform is highly, expressively programmable. The output of system generated analyses and simulations such as estimated risk tolerances, underwriting guides, capital sourcing recommendations among many others known to those knowledgeable in the art may then be sent directly to dedicated displays or formatted by the connector module 135 and distributed to existing or existing legacy infrastructure solutions to optimize enterprise unit interaction with new, advanced cross functional decision recommendations at step 404. The end result is that decision makers can focus on creative production and exception based event management rather than simplistic data collection, cleansing, and correlation tasks at step 405. In another embodiment, the processed data, instead of being presented to corporate decision makers, may be used as input to a fully autonomous system. One such system in discussed below in FIG. 8.

Figure 5:
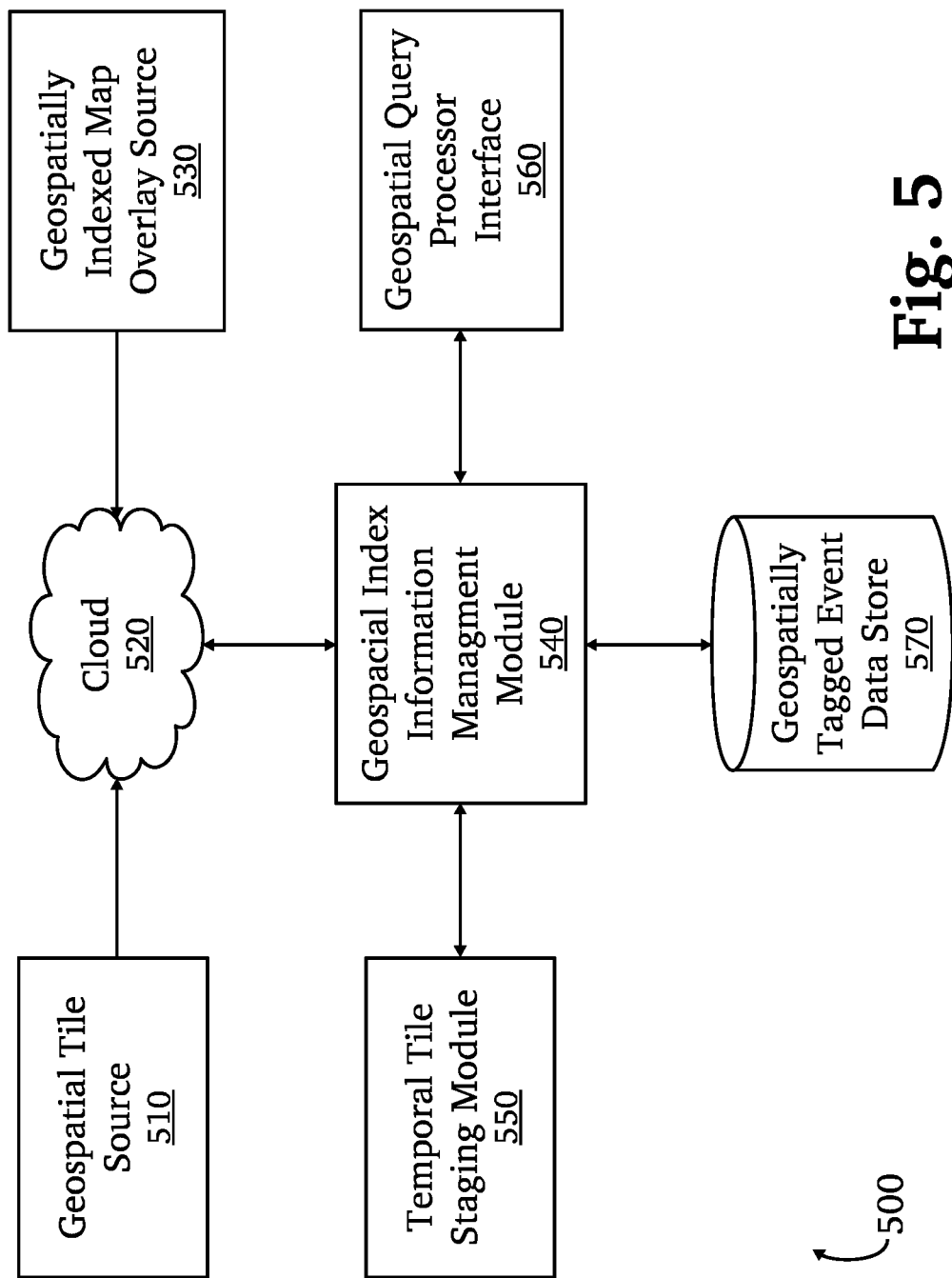
FIG. 5 is a diagram of an indexed global tile module as per one embodiment of the invention.

FIG. 5 is a diagram of an indexed global tile module 500 as per one embodiment of the invention. A significant amount of the data transformed and simulated by the enterprise operating system has an important geospatial component. Indexed global tile module 170 allows both for the geo-tagging storage of data as retrieved by the system as a whole and for the manipulation and display of data using its geological data to augment the data's usefulness in transformation, for example creating ties between two independently acquired data points to more fully explain a phenomenon; or in the display of real world, or simulated results in their correct geospatial context for greatly increased visual comprehension and memorability. Indexed global tile module 170 may consist of a geospatial index information management module which retrieves indexed geospatial tiles from a cloud-based source 510, 520 known to those skilled in the art, and may also retrieve available geospatially indexed map overlays from a geospatially indexed map overlay source 530 known to those skilled in the art. Tiles and their overlays, once retrieved, represent large amounts of potentially reusable data and are therefore stored for a pre-determined amount of time to allow rapid recall during one or more analyses on a temporal staging module 550. To be useful, it may be required that both the transformative modules of the enterprise operating system, such as, but not limited to directed computational graph module 155, automated planning service module 130, action outcome simulation module 125, and observational and state estimation service 140 be capable of both accessing and manipulating the retrieved tiles and overlays. A geospatial query processor interface 560 serves as a program interface between these system modules and geospatial index information management module 540 which fulfills the resource requests through specialized direct tile manipulation protocols, which for simplistic example may include "get tile xxx," "zoom," "rotate," "crop," "shape," "stitch," and "highlight" just to name a very few options known to those skilled in the field. During analysis, the geospatial index information management module may control the assignment of geospatial data and the running transforming functions to one or more swimlanes to expedite timely completion and correct storage of the resultant data with associated geotags. The transformed tiles with all associated transformation tagging may be stored in a geospatially tagged event data store 570 for future review. Alternatively, just the geotagged transformation data or geotagged tile views may be stored for future retrieval of the actual tile and review depending on the need and circumstance. There may also be occasions where time series data from specific geographical locations are stored in multidimensional time series data store 120 with geo-tags provided by geospatial index information management module 540.

Figure 6:
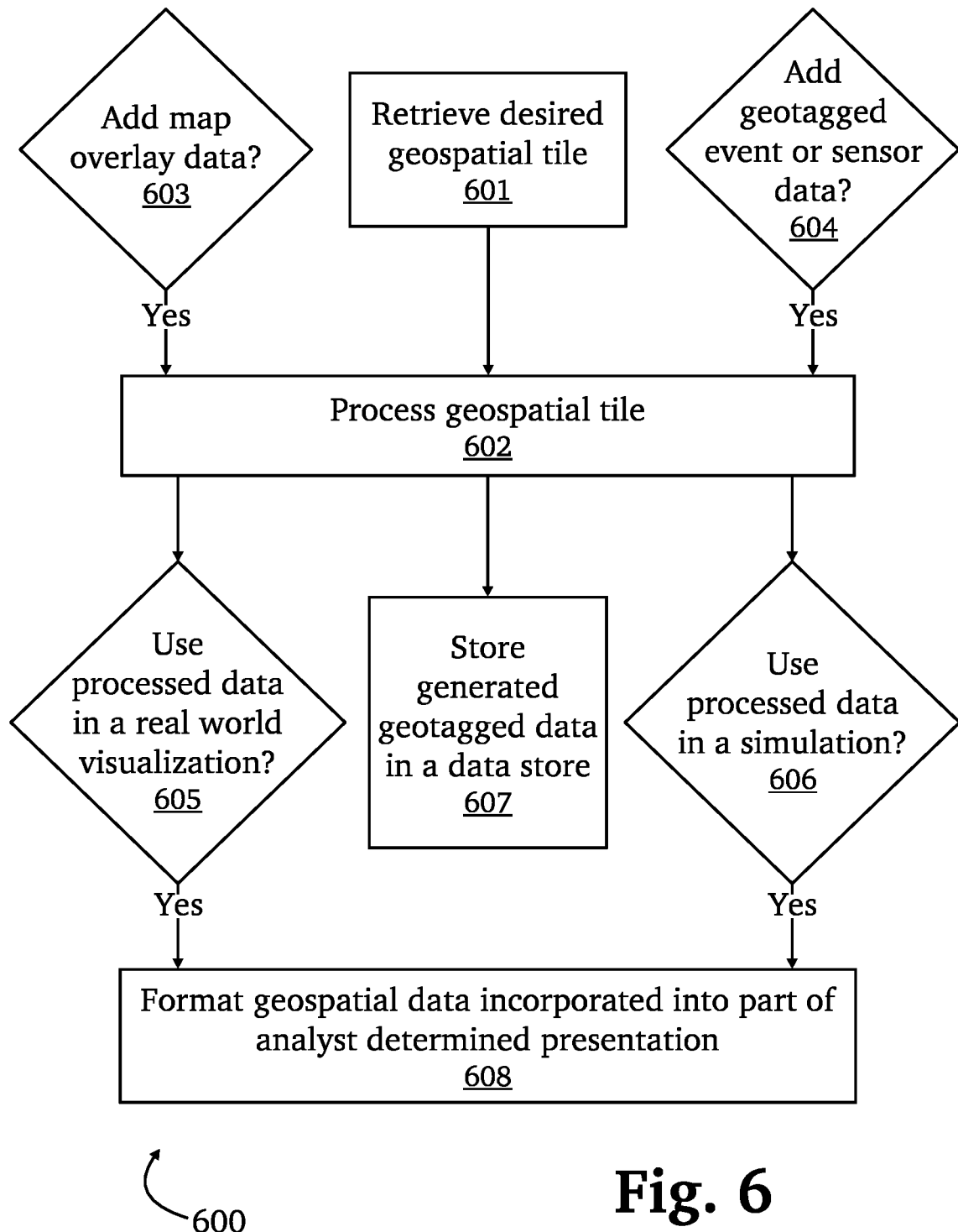
FIG. 6 is a flow diagram illustrating the function of the indexed global tile module as per one embodiment of the invention.

FIG. 6 is a flow diagram illustrating the function 600 of the indexed global tile module as per one embodiment of the invention. Predesignated, indexed geospatial tiles are retrieved from sources known to those skilled in the art at step 601. Available map overlay data, retrieved from one of multiple sources at step 603 known to those skilled in the art may be retrieved per user design. The geospatial tiles may then be processed in one or more of a plurality of ways according to the design of the running analysis at step 602, at which time geo-tagged event or sensor data may be associated with the indexed tile at step 604. Data relating to tile processing, which may include the tile itself is then stored for later review or analysis at step 607. The geo-data, in part, or in its entirety may be used in one or more transformations that are part of a real-world data presentation at step 605. The geo-data in part or in its entirety may be used in one or more transformations that are part of a simulation at step 606. At least some of the geospatial data may be used in an analyst determined direct visual presentation or may be formatted and transmitted for use in third party solutions at step 608.

Figure 7:
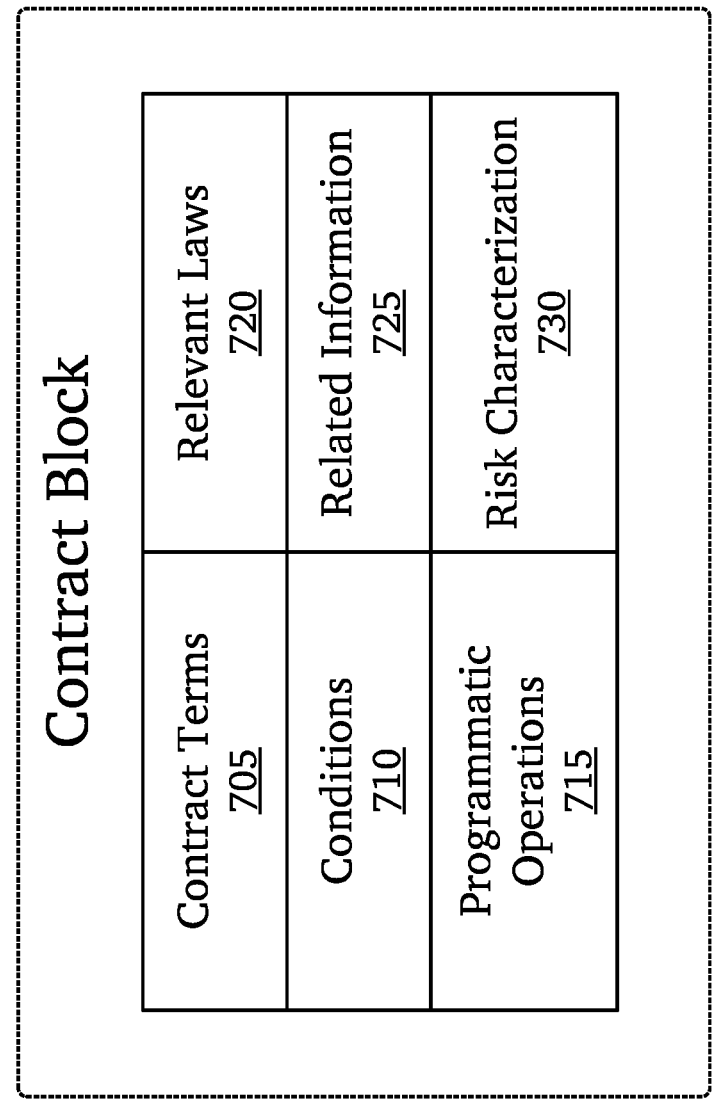
FIG. 7 is a block diagram of an exemplary contract block as used in various embodiments of the invention.

In another embodiment, a system configured to use enterprise operating system 100 for insurance applications, as discussed above, may be further configured to autonomously operate and manage various aspects of an insurance company. In order to have a more uniformly formatted dataset, which may result more efficiency in machine-processing, the autonomous system may use a domain specific language to embody contracts. FIG. 7 is a block diagram of an exemplary contract block 700 as used in various embodiments of the invention. Contract block 700 may define a financially-backed contractual agreement using a contract definition language (CDL), used herein as a declarative specification domain-specific computer language for a contract. This may allow for defining and storing a contract in graph database form, which may be efficiently processed by enterprise operating system 100 after term extraction occurs using Natural Language Processing techniques to ingest, normalize, and semantify unstructured text. It should be understood that contract block 700 is not limited to only insurance purposes, as used in these disclosed embodiments, but may be used for any contractually-binding financial obligations such as a work contract, a purchase contract, and the like. The inherent uniformity may negate the need for manually formalizing the contract information, and may also contribute to increased efficiency when used in autonomous processes, for instance, when used as input data for a machine learning model. Contract block 700 may comprise information such as, but is not limited to, contract terms 705, conditions of a contract 710, programmatic operation instructions 715, relevant laws 720, general data 725, risk characterization 730, and the like all expressed using the CDL. An instance of a contract block 700 may be created for each policyholder, or for each policy, depending on configuration and requirements, and may be stored into memory for later retrieval. A front-end may be provided to access a contract block in human-readable form, and allow for changes to made to the compiled information.

Contract terms 705 may define what is covered under a particular contract, as well as information on the contract holder. For instance, the terms may dictate that a certain home, or a certain enterprise is protected from damages caused by a fire.

Conditions 710 may define conditions or triggers that may be required before the contract takes effect. This may be based on one or more conditions such as triggering of on-premise sensors; naturally occurring events, such as a storm or flood; time-based; satellite or drone imagery; and the like. Conditions 710 may also trigger programmatic operation instructions 715, which are discussed below. Using the fire example from above, a home or enterprise may have sensors, such as a smoke detector or a specialized sensor installed to detect heat damage, installed on the premises of the home or enterprise to detect a fire. In the event of a fire, the smoke detector and the sensor may be triggered, which may in turn trigger a request to be automatically sent to a satellite or drone image provider for visual confirmation of damages.

Programmatic operation instructions 715 may be built-in or user-defined programmable instructions embedded into each instance of a contract block. Instructions may include automatically processing payouts when certain conditions or triggers occur; occasional automatic reanalysis of a contract to take into consideration changes in things like laws, regulations, and pricing; automatic modeling and projection of losses; submitting queries to other components or external services; and the like.

Relevant laws 720 may comprise data based on laws and regulations relevant to a particular contract. Relevant information may include enterprise-based or geography based regulatory rules, local laws, and the like. This may allow other components to quickly retrieve data for calculations in which laws and regulations play an integral part. The data may be automatically updated with programmatic operation instructions 715.

General data 725 may be general data pertaining to the contract such as, but is not limited to, property information, such as appraised value or history; a policyholder's medical records; and the like. Similar to relevant laws 720, general data 725 may allow other components to quickly retrieve data when such data is required.

Risk characterization 730 for may be risk independently characterized using operations and data within contract block 700. By preprocessing the risk characterization, external processes may remain peril- and model-agnostic when processing the contract block; for example, when used in a rules engine, which is discussed further below.

Figure 8:
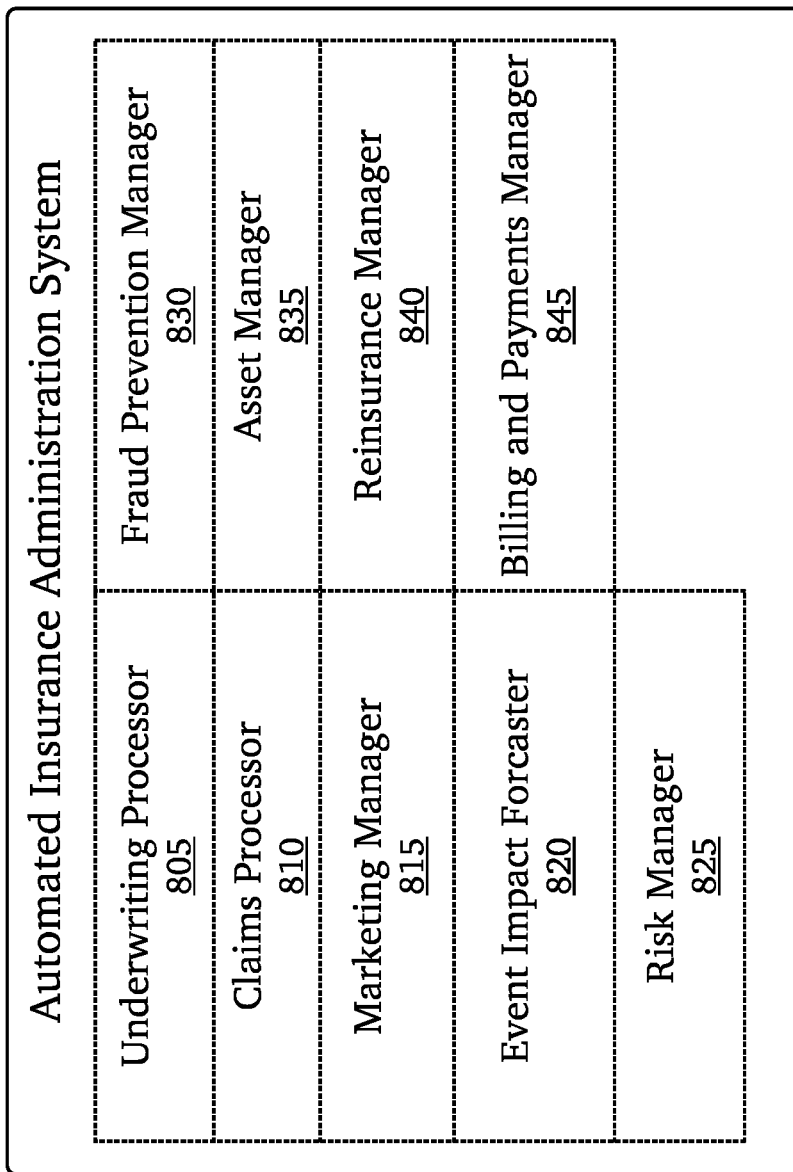
FIG. 8 is a block diagram illustrating an exemplary automated insurance administration system as used in various embodiments of the invention.

FIG. 8 is a block diagram illustrating an exemplary automated insurance administration system 800 as used in various embodiments of the invention. System 800 may comprise a plurality of components: an underwriting processor 805, a claims processor 810, a marketing manager 815, an event impact forecaster 820, a risk manager 825, a fraud prevention manager 830, an asset manager 835, a reinsurance manager 840, and a billing and payments manager 845. System 800 may utilize contract blocks throughout, and be configured with an application programming interface (API) specifically for reading and efficiently processing the CDL used in contract blocks.

Other embodiments may have other components that are not listed here, or may have a subset of the components listed here without deviating from the inventive concept of the invention. The components may also not be required to be present on a single system, and may be split apart to a plurality of systems that may be operating independently.

Underwriting processor 805 may be configured to autonomously process requests for underwriting, and may be accessible from a computer or mobile device through a web portal or mobile application. Upon receiving an underwriting request, underwriting processor 805 may create a new instance of a contract block, described in FIG. 7, by compile the provided information using the CDL. Underwriting processor 805 may comprise sub-routines to autonomously perform contract analysis such as a rules engine, a parametric evaluator, an optimizer, a portfolio constructer, and a model and geocoding service. The rules engine may be configured from directed computation graph module 155, and may allow for evaluation of a contract or a plurality of contracts, which may be bundled into books or portfolios, using the associated transformer service modules. The rules engine may evaluate the contracts via a forward-chaining battery of tests. The selection of tests may be modular, and may comprise tests that are universal and applicable to a wide variety of contracts. The results from the rules engine may be a list of offers labeled for rejection, underwrite, refer, or resubmit based metrics such as, legal risks, risk aggregation, risk accumulation, whether it fits into a particular portfolio, and the like.

Other uses of the rules engine may include, but is not limited to, validating contracts; verifying the legality of a request based on rules, laws, and regulations associated with locality and line of business; evaluating of contract-specific terms and requirements as specified in underwriting guidelines configured in the system; evaluation of peril-specific terms and requirements, such as geolocality restrictions; evaluation of portfolio impact; evaluation against projected deal flow; and the like.

When applied to a contract block, the rules engine may validate specific terms, conditions, observables, or parameters expressed by the CDL via a deduction of facts derived from the contract block until a conclusion is reached. The rules engine may also determine that a contract block is incomplete, such as in a case of inconclusive results from the deduction of facts, and may require a requester to resubmit his request with additional information.

The parametric evaluator may be configured from action outcome simulation module 125, and may explore possible product offerings based on requirements of an underwriting requester. The parametric evaluator may run test submissions to the rules engine, and compiles the outcome. Associated pricing may also be optionally included. The parametric evaluator may also utilize machine learning models to process historic requests and decisions with similar contexts to determine other possible offerings.

The optimizer may be configured from automated planning service module 130. The optimizer receives results from the parametric evaluator and further refines the offerings based on historical underwriting from one or more organizations, or one or more underwriters. The optimizer may utilize machine learning models to further process the results from the parametric evaluator to develop an understanding of potential or desirable contracts or portfolios to underwrite, and use this development in optimization of future requests.

The portfolio constructer may be configured from observation and state estimation service 140, and may use a blend of rules and learning mechanisms to further refine the number of offers made to the requester. The portfolio constructer may not focus on factors relating to rules evaluation, such as technical pricing and risk accumulation, and instead consider other factors such as deal flows, or pending requests from other requesters to determine the viability and profitability of certain deal based on the opportunity cost of underwriting a particular request.

The model and geocoding service may use peril-specific information from a contract block to model and evaluate the contract's impact to a portfolio. The model and geocoding service may additionally utilize index global tile module 170 to evaluate the loss impact of geography-related perils such as, chance of flooding, chance of major storms, chance of earthquakes, and the like.

The subroutines of underwriting processer 805 are not all required to be present on a single system, and may be split across a plurality of hardware systems, where each system may operate independently. The subroutines may also not be configured as described above, and may instead be specialized stand-alone components; may be configured from different modules; may be an application-specific integrated circuit (ASIC) designed to perform the task; or the like.

Claims processor 810 may be configured to autonomously process insurance claims requests. Similar to underwriting processor 805, claims processor 810 may be accessed from personal computer or mobile device through a web portal or mobile application. When an insured makes a claim request, system 800 may retrieve a contract block belonging to the insured, and may request information regarding the claim from the user, such as a picture or video of damages. Claims processor 810 may also use the data collecting functions of enterprise operating system 100 to independently, and autonomously, gather other information regarding a claim, which may include, but is not limited to, getting multidimensional time series data from on-site sensors, making calls to insurance marketplaces, getting data from third party services like drones or satellite providers, acquiring medical records of the user, and the like. The collected data may then be processed using enterprise operating system 100. Claims processor 810 may also utilize fraud prevention manager 830, discussed below, to verify that the collected information is authentic, and has not been tampered with. If a user's claim is approved, billing and payments manager 845, discussed below, may be used to handle payouts. Marketing manager 815 may be configured to autonomously identify desirable underwriting criteria to maximize portfolio profitability. Marketing manager 815 may evaluate factors such as availability, reinsurance, pricing, associated risks, and the like.

Event impact forecaster 820 may be configured to automate proactive loss estimation. Event impact forecaster 820 may utilize enterprise operating system 100 to collect data from sensors, exogenous data, claims submission, satellite imagery, drone foots, and the like. The data may then be processed using models to determine the extent of damages caused by an event, and predict loss. Event impact forecaster 820 may also call on asset manager 835, discussed below, to manage assets to in order to handle the loss estimation. Event impact forecaster 820 may also be configured to provide automated payouts to insureds using billing and payments manager 845.

Risk manager 825 may be configured to autonomously quantify of additional risks associated with insuring a particular policyholder. This may be based on, for example, legal risks, regulatory risks, compliancy, and the like. The metrics generated by risk manager 825 may be used by other processes when calculation of associated risks is required.

Fraud prevention manager 830 may be configured to autonomously detect and prevent malicious or anomalous activity, and serve as a general framework for fraud prevention and detection for system 800. In one application, fraud prevention manager 830 may be used to prevent system abuse by a malicious party by verifying collected information for authenticity via the robust data extraction, and validation capabilities of enterprise operating system 100. For example, a submitted picture may be validated using entropy analysis. Fraud prevention manager 830 may also be modular in nature as to allow new models to be easily added to extend the algorithms used for detection and prevention of newly developed threats.

Fraud prevention manager 830 may also be configured to monitor an insured user's activity while accessing their accounts for anomalies and unauthorized account access. Fraud prevention manager 830 may look for activity anomalies such as time of login, locations of login, anomalous purchases, adding unusual bank accounts or payment info, unusual interactions with the mobile application or web portal, and the like.

Asset manager 835 may be configured to autonomously manage an insurance company's assets. Asset manager 835 may maintain target asset distributions, volatilities and exposures, liquidity profiles, tax optimization, and dynamically modulate asset status based on expected liquid capital demands, risk status from forecasted losses, or exposures in live portfolios. For example, asset manager 835 may be configured to automatically move assets to a more liquid state if a major event, such as a natural disaster, is forecasted in anticipation of a surge of incoming claims. Additionally, with the use of advanced investment capabilities provided by enterprise operating system 100, asset manager 835 may also manage investments to maximize investment returns.

Reinsurance manager 840 may be configured to autonomously manage reinsurance through portfolio reanalysis, and pricing estimates for transferring selected risks to additional parties. Reinsurance manager 840 may dynamically acquire, as well as cancel, reinsurance based on potential to take on new customers, cost of sharing selected risks, insurance-linked securities (ILS), capital market positions, present concentration of coverage in a particular area, and the like. Different types of reinsurance may be combined to take advantage of changing availability and price expectations which may include, but is not limited to, quota share capacity, cat cover, per risk allocation per location or other definition, specific casualty treaties, ILS, and securitization via collateralized loan obligations.

Billing and payments manager 845 may be used autonomously manage billing and payments functionality. Billing and payments manager 845 may integrate with a payment processor such as STRIPE MARKETPLACE, credit card processors, Automated Clearing House (ACH), SWIFT payment network, and the like. Billing and payments manager 845 may retrieve account information of a particular contract from the associated contract block and automatically process payments, and payouts using the account information. In some embodiments, billing and payments manager 845 may automatically start the process to deposition payout funds into a prepaid debit card, and have it mailed to an insured to cover losses.

Figure 12:
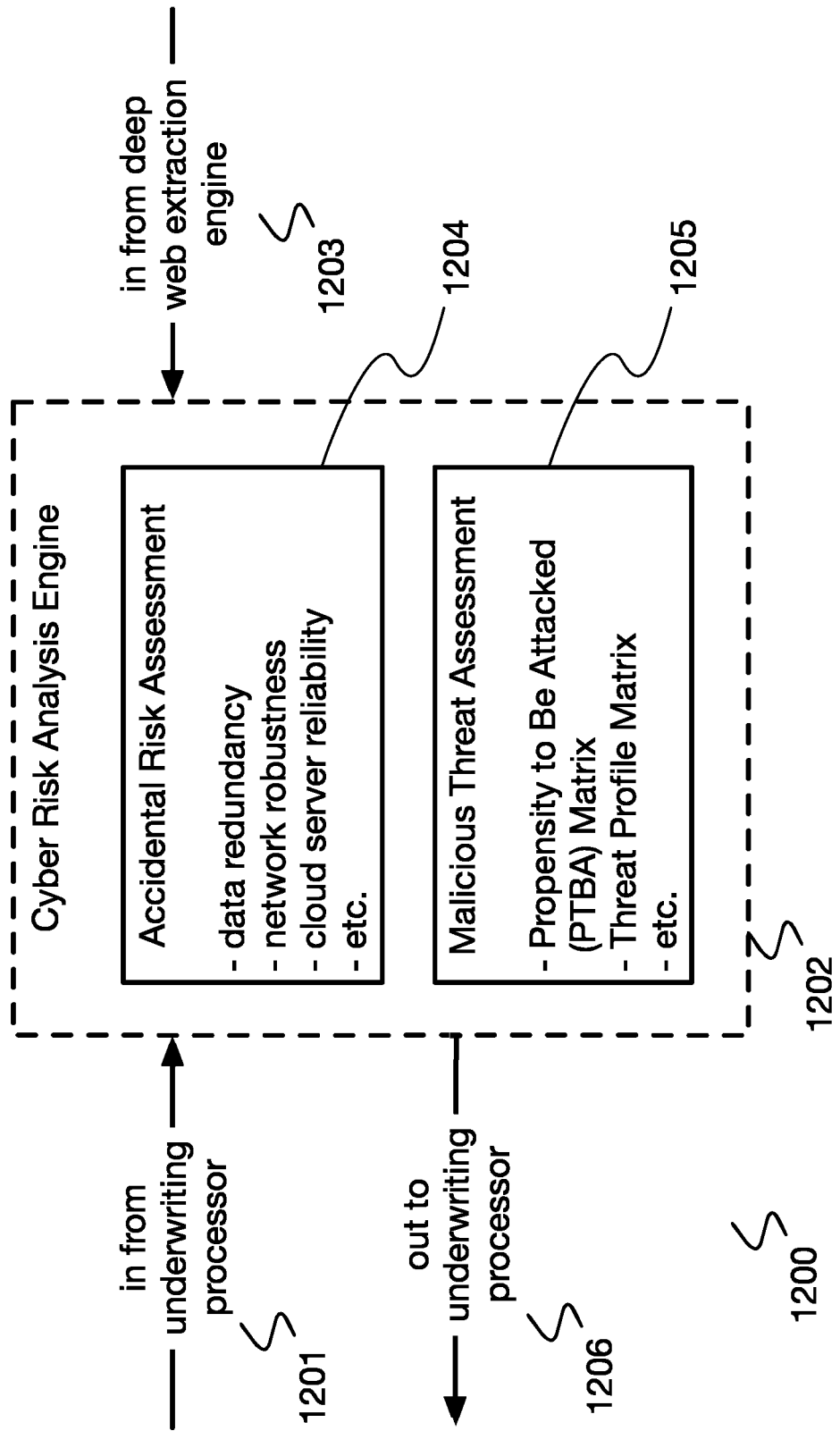
FIG. 12 is a block diagram illustrating an aspect of the invention, the cyber risk analysis engine.

FIG. 12 is a block diagram illustrating an aspect 1200 of the invention, the cyber risk analysis engine. For insurance policies involving computer and information technology related risks, relevant information is sent in 1201 from the underwriting processor to the cyber risk analysis engine 1202. Based on queries by the cyber risk analysis engine 1202, a deep web extraction engine 1203 gathers a variety of near real-time information from a plurality of online sources related to the status of networks, availability of cloud computing platforms, active and potential cyber attacks, and other information relevant to the query. The deep web extraction engine 1203 feeds the gathered information back to the cyber risk analysis engine 1202, which performs assessments using machine learning algorithms to assess risks due to both accidental causes 1204 and malicious activity 1205. The results from the risk analysis are fed back 1206 to the underwriting processor, which uses those results to perform automated underwriting management.

Detailed Description of Exemplary Aspects

Figure 9:
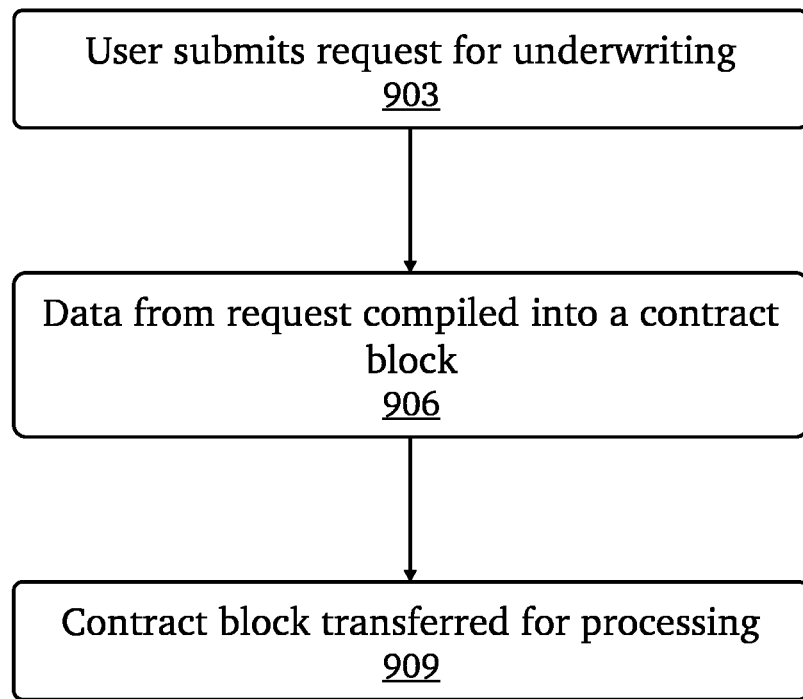
FIG. 9 is a flow chart illustrating a method for creating a contract block as used in various embodiments of the invention.

FIG. 9 is a flow chart illustrating a method 900 for creating a contract block as used in various embodiments of the invention. At an initial step 903, a user submits a request for underwriting. This may be accomplished through a web portal, a mobile app provided by an insurer, and the like. At step 906, the data provided by the user may be compiled into a contract block, which is explained in further detail in FIG. 7. The compiling may be done by the server providing the request form, or the data may be transferred to another device for compiling. In some embodiments, additionally data may be gathered by the system to be compiled, such as property records, insurance records, laws and regulations associated with the request, and the like. At step 909, the newly created contract block is transferred to an underwriting processor for processing.

Figure 10:
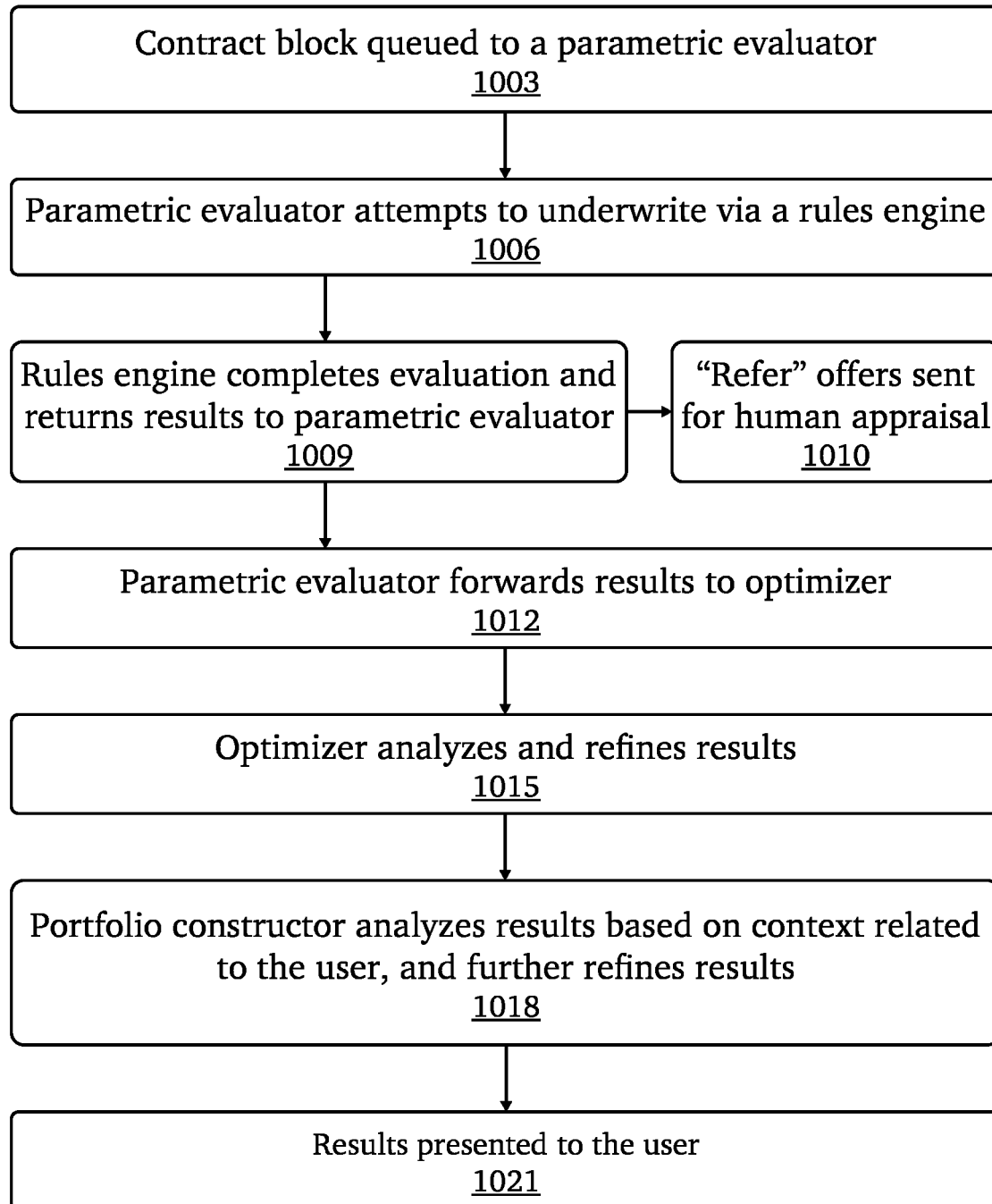
FIG. 10 is a flow chart illustrating a method for automated processing of a request for underwriting as used in various embodiments of the invention.

FIG. 10 is a flow chart illustrating a method 1000 for autonomous processing of a request for underwriting as used in various embodiments of the invention. At an initial step 1003, a newly created contract block is queued by the system to a parametric evaluator for processing. A method for created a contract block is described above in method 1000. At step 1006, the parametric evaluator attempts to underwrite using the rules engine. At step 1009, the rules engine completes the underwriting evaluation by going through each offer and assesses metrics such as risks, regulations, laws, and the like. Each offer may be labeled by the rules engine as to be rejected, underwritable, requires resubmission, or refer. By using contract blocks, as discussed above, rules engine may be done efficient, as well as allow the rules engine to be peril- and model-agnostic. Results back to the parametric evaluator. At this step, the rules engine may optionally consult with a peril-specific model and geocoder, if required in the evaluation. If any of the processed offers received a "refer" label, the offers may be optionally sent to a human operator to reevaluate at step 1010. At step 1012, the parametric evaluator forwards the results to an optimizer. At step 1015, the optimizer may use deep learning or reinforcement learning concepts to refine the results to just recommended offers based on historical underwriting and whether a contract is determined to be desirable for a particular portfolio, and forwards the optimized results to a portfolio constructer. At step 1018, portfolio constructor may assess the enterprise utility and value of the compiled offers, and compiles offers that have been approved through evaluation using a rule set. Optionally, human interaction, such as in the case of overriding an automated decision, may be used here to add offers to the list that has not been determined to be impossible to take on by the evaluation process. At step 1021, the portfolio constructer presents the user with offers approved by the system with associated pricing. In some cases, the portfolio constructor may go through the optimizer for a final round of refinement before the offers are presented to the original requester. At this point the contract block may be stored into memory for future retrieval. For example, if a requester is shopping around for best pricing from different providers, the created contract block may be stored in memory and may be retrieved to be viewed at a later time. If the requester decides to take up on one or more offers, the system may change the status of the contract block.

Figure 11:
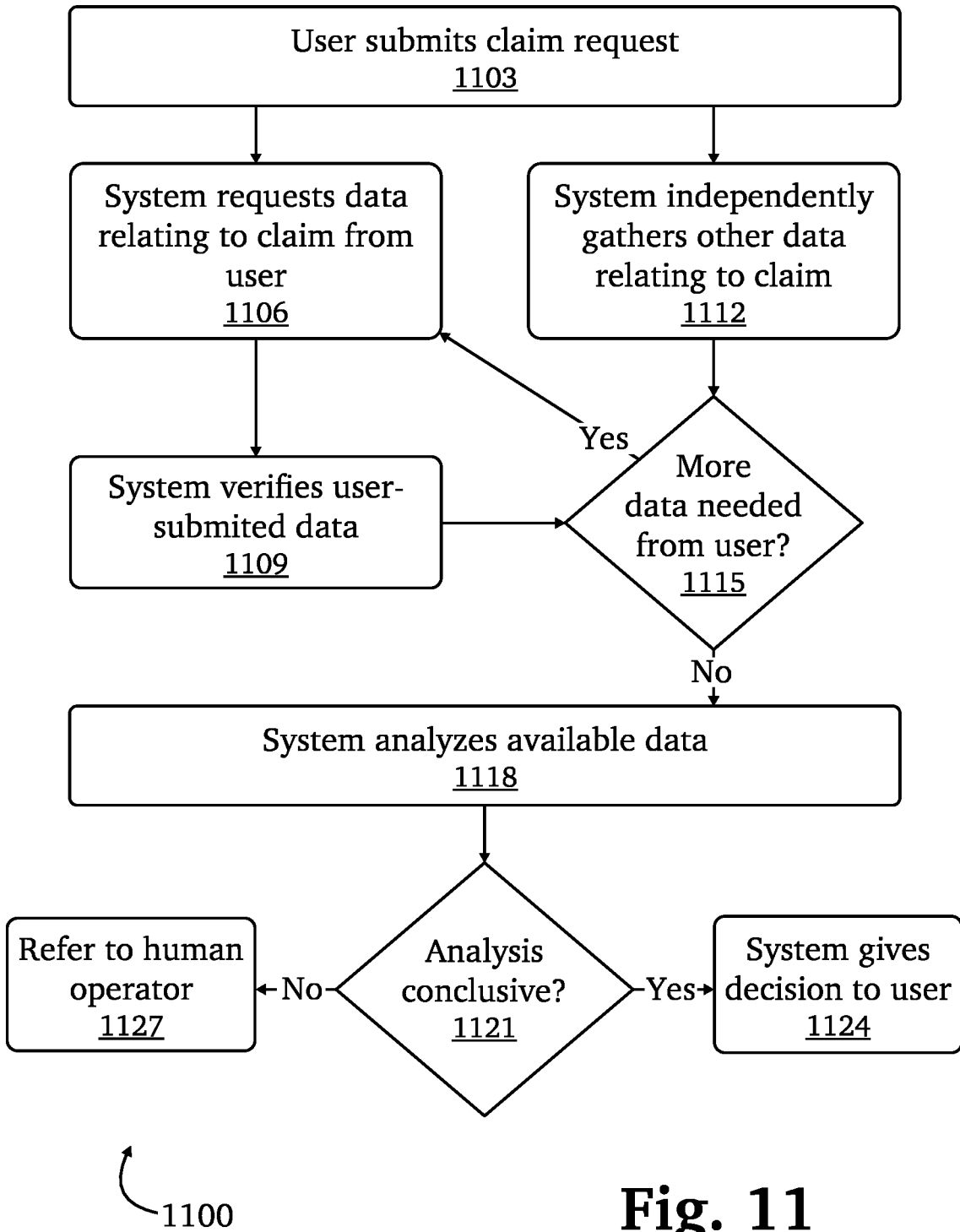
FIG. 11 is a flow chart illustrating a method for automated claims processing as used in various embodiments of the invention.

FIG. 11 is a flow chart illustrating a method 1100 for automated claims processing as used in various embodiments of the invention. At an initial step 1103, submits a claim request to an automated insurance system. This may be after the user has provided credentials, and a contract block associated to the user has been retrieved by the system. At step 1106, the system requests that the user provide data regarding the claim to the system, such as photos or videos of damages. At step 1112, the system may begin to independently gather information, such as making automated calls to an insurance marketplace, requesting on-site verification from a third-party service such as a drone or satellite provider, retrieving data stored on the contract block, status of one or more sensors located at the property of the user, and the like. In some cases, and ideally not a frequent occurrence, the automated system may crowd-source verification from unaffiliated bystanders, or send a verified claims adjuster to the site. In some cases, steps 1106 and 1112 may be executed simultaneously, and operating in parallel, while in other cases one of the steps may occur at a later time. At step 1109, the system verifies the user-submitted data by analyzing it with a fraud prevention manager, which is discussed above in FIG. 830. At step 1115, the system determines whether more data is required from the user. If more data is required, the flow returns to step 1106, and the user is asked to provide more information. This may be a result of the submitted data being unsatisfactory, such as a photo taken from a strange angle or blurry footage; or it may be safeguard enacted by the fraud prevention manager after it has detected that the files provided by the user has been determined by the system to be anomalous or that the user's monitored interaction with the insurance system has been determined to anomalous.

On the other hand, if no more data is required from the user, the system analyzes the available data, both provided and gathered, to determine whether a payout to the user is warranted at step 1118. At step 1121, if the data analysis in conclusive, the system may either approve or deny the claim request, along with an explanation for the decision if required at step 1124. However, if analysis is inconclusive at step 1121, the data may be deferred to a human operator for further analysis at step 1127. A report prepared by the system on regarding the analysis may also be generated and submitted.

In some embodiments, the system may be configured to provided automatic payout in the event of a claim request approval, which may utilize the billing and payments manager, which is discussed above.

It should be understood that although the methods described in FIGS. 10 and 11 includes the involvement of a human operator as a possible outcome, the inclusion is intended as a safety measure that, ideally, is not used often.

Figure 13:
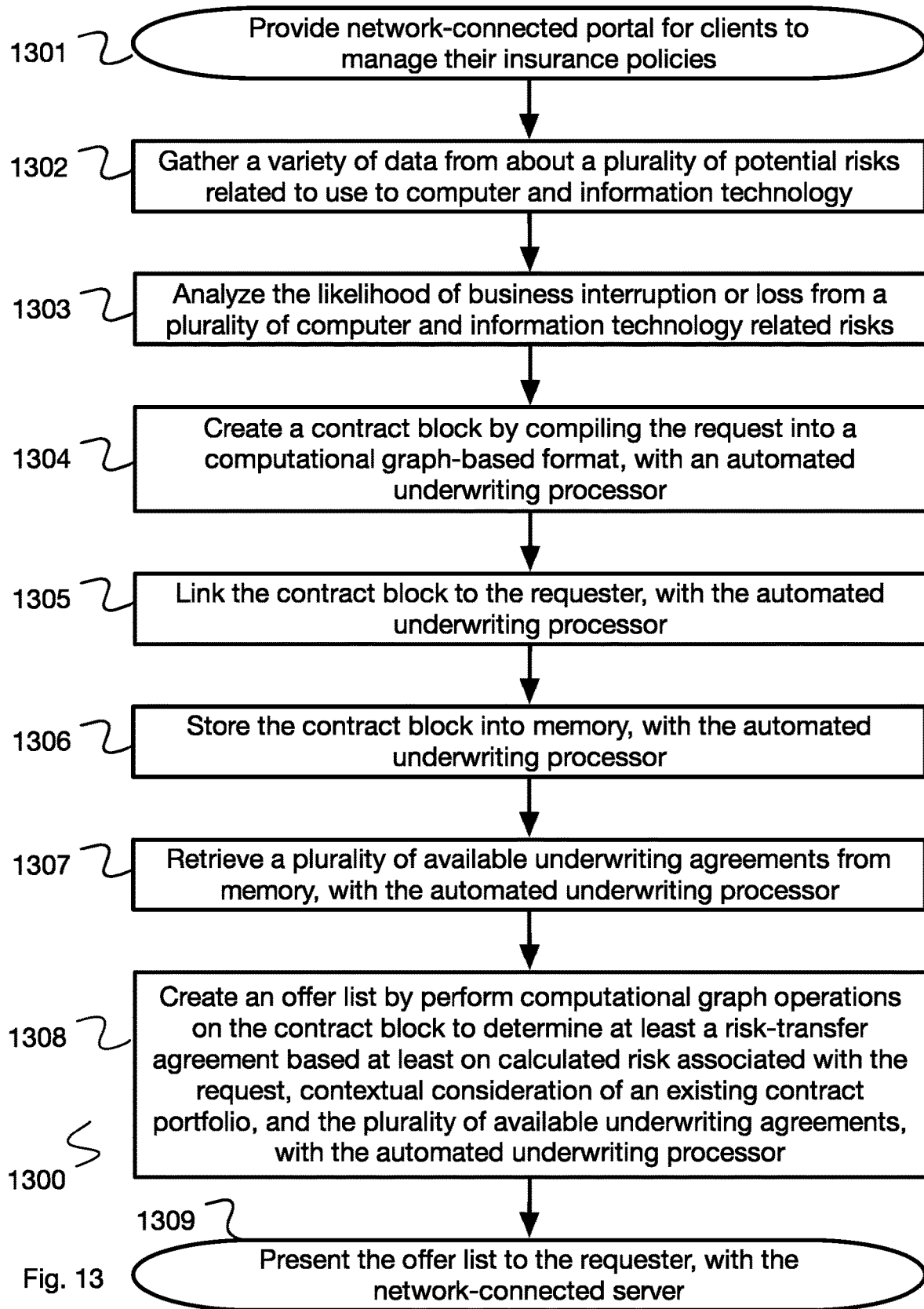
FIG. 13 is a flow chart illustrating a method for automated issuance and management of insurance policies related to computer and information technology related risks as used in various embodiments of the invention.

FIG. 13 is a flow chart illustrating a method 1300 for automated issuance and management of insurance policies related to computer and information technology related risks as used in various embodiments of the invention, comprising the steps of: (a) providing a network-connected portal for clients to manage their insurance policies 1301; (b) gathering a variety of data from about a plurality of potential risks related to use to computer and information technology 1302; (c) analyzing the likelihood of operational interruption or loss from a plurality of computer and information technology related risks 1303; (d) creating a contract block by compiling the request into a computational graph-based format, with an automated underwriting processor 1304; (e)

linking the contract block to the requester, with the automated underwriting processor 1305; (f) storing the contract block into memory, with the automated underwriting processor 1306; (g) retrieving a plurality of available underwriting agreements from memory, with the automated underwriting processor 1307; (h) creating an offer list by perform computational graph operations on the contract block to determine at least a risk-transfer agreement based at least on calculated risk associated with the request, contextual consideration of an existing contract portfolio, and the plurality of available underwriting agreements, with the automated underwriting processor 1308; and (i) presenting the offer list to the requester, with the network-connected server 1309.

FIG. 14 is a diagram illustrating an aspect of an embodiment, a propensity to be attacked (PTBA) matrix 1400 applicable to evaluating risk due to malicious actors. Not all insureds are equally likely to be attacked, and not all assets of a given insured are equally likely to be targeted. The propensity to be attacked (PTBA) matrix breaks down the cyber underwriting decision making process granularly, providing assessments of the likelihood of attack based on the type of attacker 1401 and the client's data assets 1402, and combining them into a resilience score for each category 1403. In the absence of actual operational data, the system can use secondary metrics (e.g., industry type, firm size, etc.) to complete the matrix.

FIG. 15 is a diagram illustrating an aspect of an embodiment, a threat profile matrix 1500, applicable to evaluating risk due to malicious actors. Potential threats are organized by threat level 1501 from attacks by nation states (threat level 1) to attacks by individuals (threat level 8). Threats at each level are further classified by the level of commitment of the attacker 1502 and the resources available to the attacker 1503.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 16:
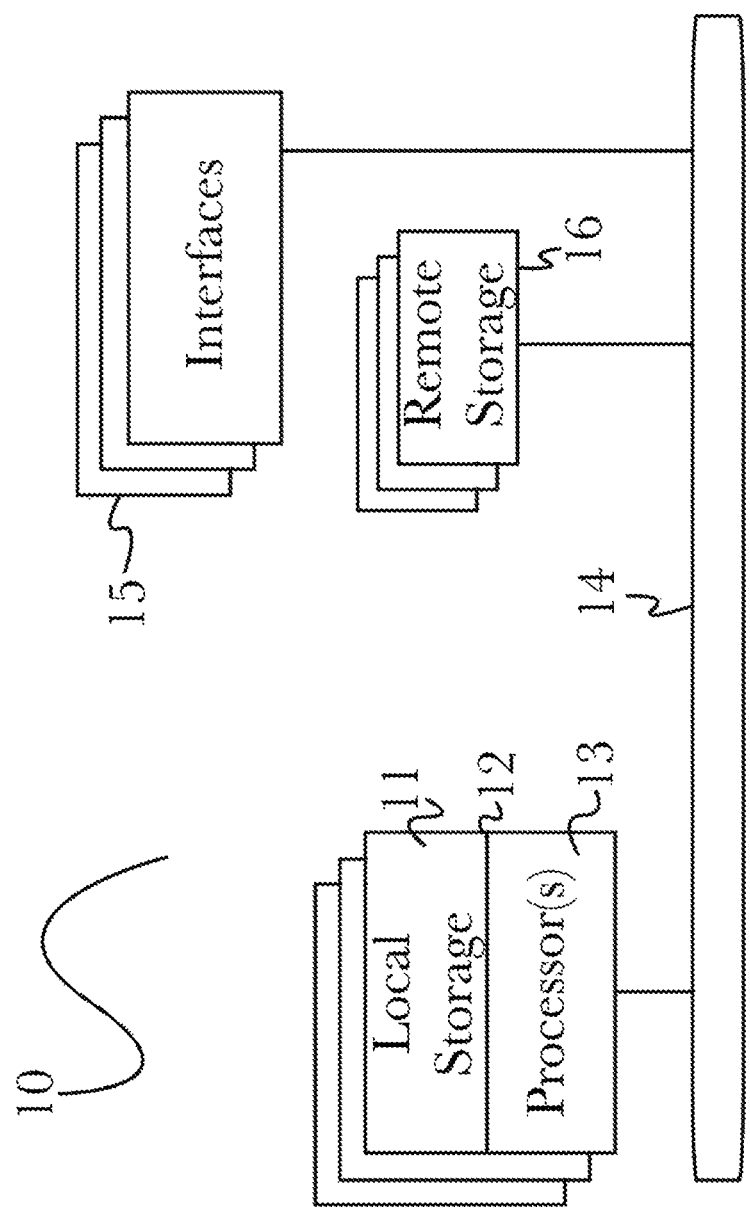
FIG. 16 is a block diagram illustrating an exemplary hardware architecture of a computing device used in various embodiments of the invention.

Referring now to FIG. 16, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network;

other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 16 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 17:
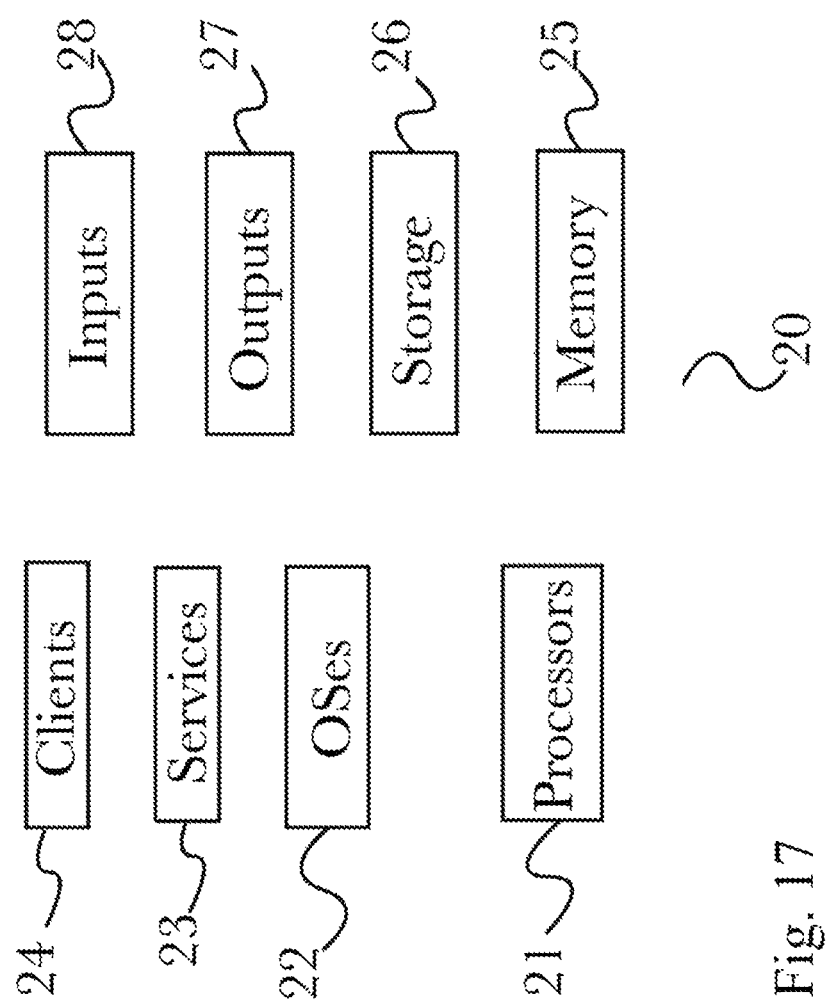
FIG. 17 is a block diagram illustrating an exemplary logical architecture for a client device, according to various embodiments of the invention.

In some aspects, systems may be implemented on a standalone computing system. Referring now to FIG. 17, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 16). Examples of storage devices 26 include flash memory, magnetic hard drive, CD-ROM, and/or the like.

Figure 18:
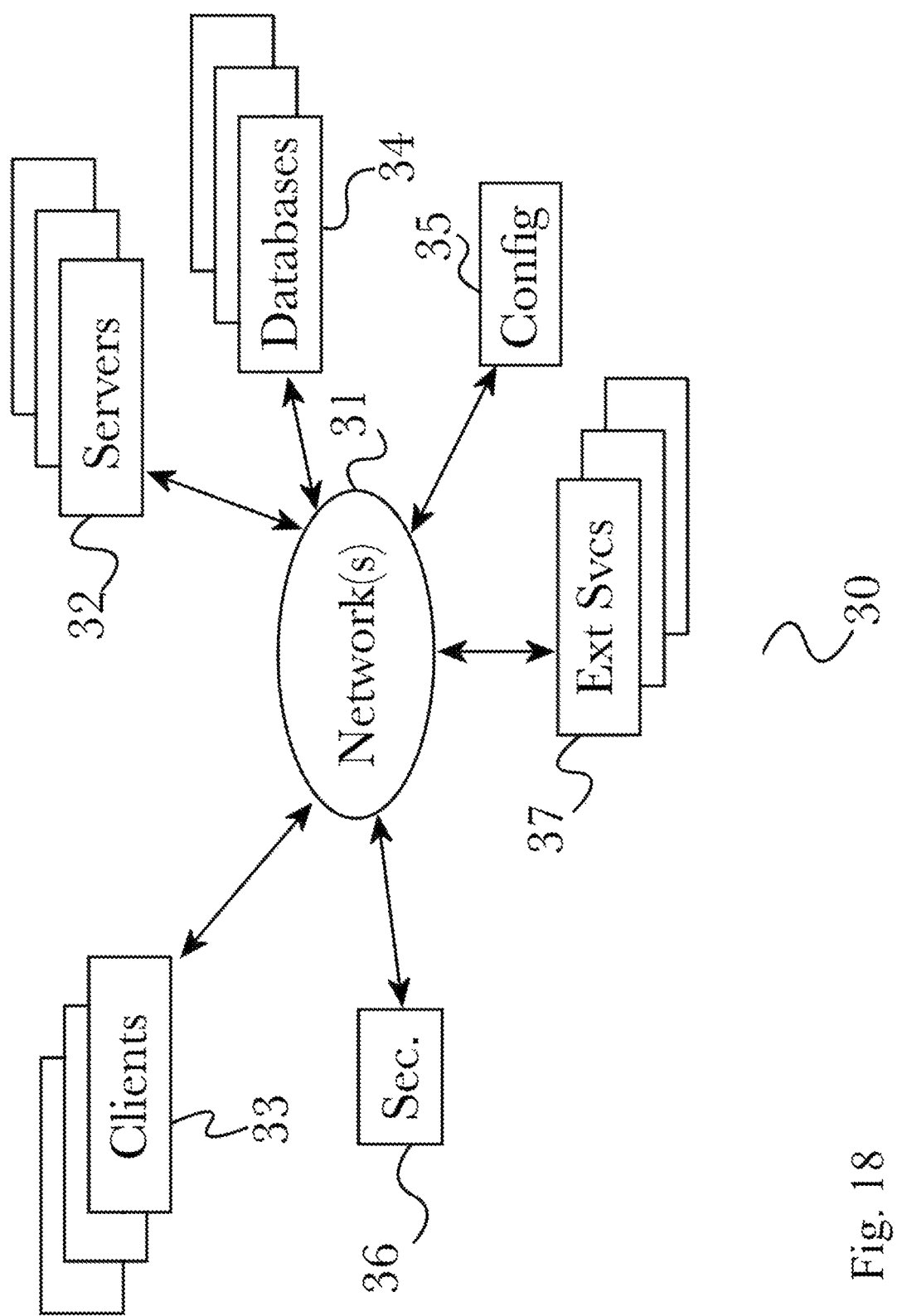
FIG. 18 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 18, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 17. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 19:
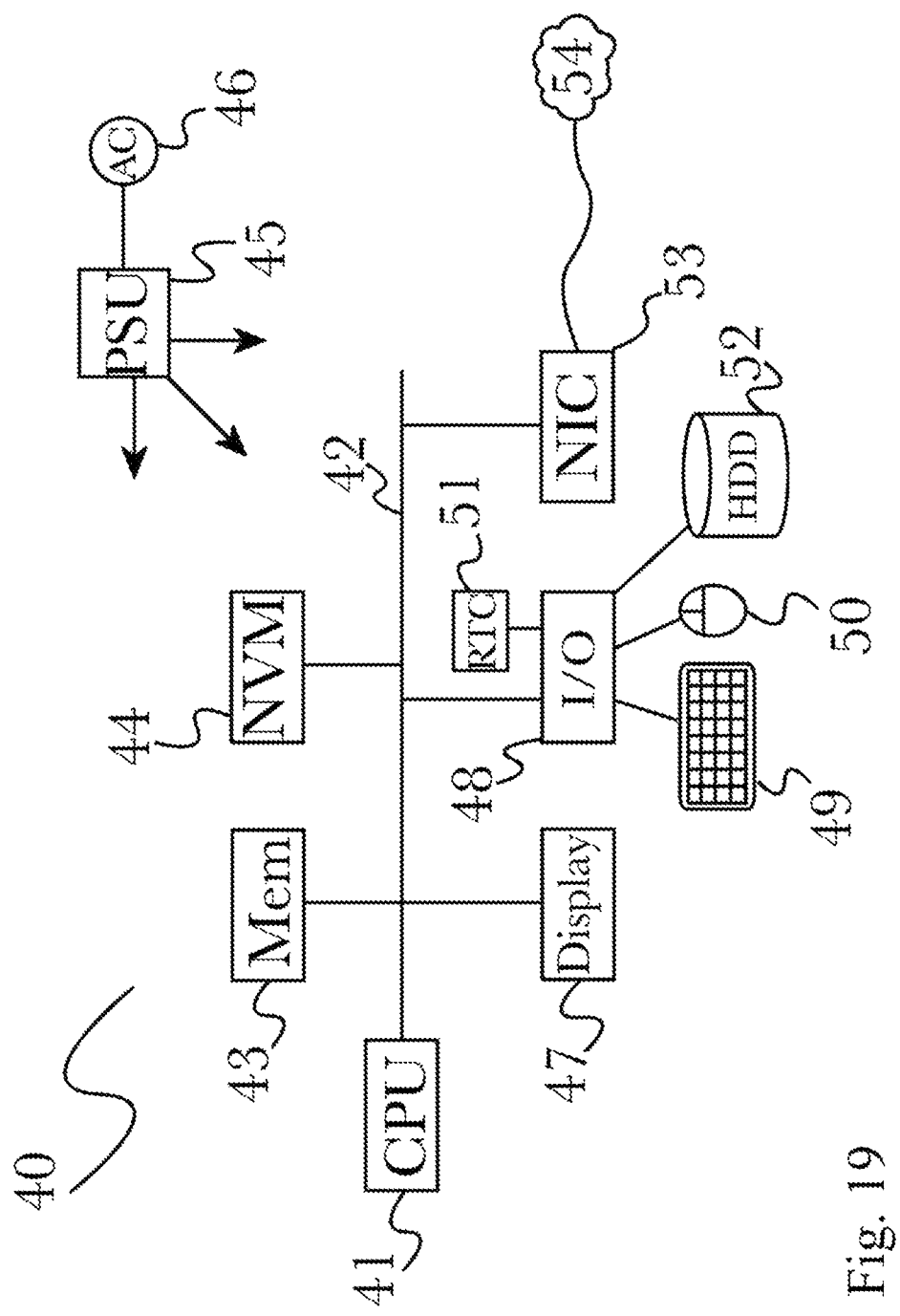
FIG. 19 is another block diagram illustrating an exemplary hardware architecture of a computing device used in various embodiments of the invention.

FIG. 19 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for autonomous issuance and management of insurance policies for operational interruption and losses associated with computer and technology related risks, comprising:

a network-connected server comprising a memory and a processor;

a deep web extraction engine comprising a first plurality of programming instructions stored in the memory and operable on the processor, wherein the first plurality of programming instructions, when operating on the processor, cause the network-connected server to gather data about a plurality of potential risks related to use to computer and information technology;

a cyber risk analysis engine comprising a second plurality of programming instructions stored in the memory and operable on the processor, wherein the second plurality of programming instructions, when operating on the processor, cause the network-connected server to analyze the likelihood of operational interruption or loss from a plurality of computer and information technology related risks by utilizing machine learning to predict risk from both accidental events and deliberate malicious activity; and an automated underwriting processor comprising a fourth plurality of programming instructions stored in the memory and operable on the processor, wherein the fourth plurality of programming instructions, when operating on the processor, cause the network-connected server to:

create a contract block by compiling the request into a computational graph-based format;

link the contract block to the requester;

store the contract block into memory;

retrieve a plurality of available underwriting agreements from memory; and create an offer list by performing computational graph operations on the contract block to determine at least a risk-transfer agreement based at least on calculated risk associated with the request, contextual consideration of an existing contract portfolio, and the plurality of available underwriting agreements.

2. The system of claim 1, wherein at least a term and a condition of an offer are added to the contract block after the requester agrees to the terms of an offer from the offer list.

3. The system of claim 2, further comprising a claims processor comprising a fifth plurality of programming instructions stored in the memory and operable on the processor, wherein the fifth plurality of programming instructions, when operating on the processor, cause the network-connected server to:

receive a claim request from an insured;

retrieve a contract block linked to the insured;

process the claims request to determine a payout amount based at least on a term and a condition stored in the graph-based dataset; and process the payout amount using a billing and payments manager.

4. The system of claim 1, wherein at least a portion of the information contained in the contract block is risk characterization of the contract block, allowing external operations to be peril-agnostic and model-agnostic.

5. A method for autonomous management of risk transfer, comprising the steps of:

(a) gathering a variety of data from about a plurality of potential risks related to use to computer and information technology;

(b) analyzing the likelihood of operational interruption or loss from a plurality of computer and information technology related risks, by utilizing machine learning to predict risk from both accidental events and deliberate malicious activity;

(c) creating a contract block by compiling the request into a computational graph-based format, with an automated underwriting processor;

(d) linking the contract block to the requester, with the automated underwriting processor;

(e) storing the contract block into memory, with the automated underwriting processor;

(f) retrieving a plurality of available underwriting agreements from memory, with the automated underwriting processor; and (g) creating an offer list by performing computational graph operations on the contract block to determine at least a risk-transfer agreement based at least on calculated risk associated with the request, contextual consideration of an existing contract portfolio, and the plurality of available underwriting agreements, with the automated underwriting processor.

6. The method of claim 5, wherein at least a term and a condition of an offer are added to the contract block after the requester agrees to the terms of an offer from the offer list.

7. The method of claim 6, further comprising the steps of:

receiving a claim request from an insured;

retrieving a contract block linked to the insured;

processing the claims request to determine a payout amount based at least on a term and a condition stored in the graph-based dataset; and processing the payout amount using a billing and payments manager.

8. The method of claim 5, wherein at least a portion of the information contained in the contract block is risk characterization of the contract block, allowing external operations to be peril-agnostic and model-agnostic.

* * * * *